US012586226B2

(12) United States Patent
Graham et al.

(10) Patent No.: US 12,586,226 B2
(45) Date of Patent: Mar. 24, 2026

(54) METHOD FOR INSPECTING AN OBJECT

(71) Applicants: General Electric Company, Schenectady, NY (US); Oliver Crispin Robotics Limited, Altrincham (GB)

(72) Inventors: Andrew Crispin Graham, Badminton (GB); Julian Matthew Foxall, Bristol (GB); James Vradenburg Miller, Clifton Park, NY (US); Walter V. Dixon, Delanson, NY (US); Vijay Shirsat, Bristol (GB)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 269 days.

(21) Appl. No.: 17/373,925

(22) Filed: Jul. 13, 2021

(65) Prior Publication Data

US 2023/0018554 A1     Jan. 19, 2023

(51) Int. Cl.
| | |
|---|---|
| *G06T 7/564* | (2017.01) |
| *G01B 11/25* | (2006.01) |
| *G06T 17/20* | (2006.01) |

(52) U.S. Cl.
CPC .......... *G06T 7/564* (2017.01); *G01B 11/2513* (2013.01); *G06T 17/20* (2013.01); *G06T 2200/08* (2013.01); *G06T 2207/10028* (2013.01)

(58) Field of Classification Search
CPC .................... G06T 7/564; G06T 17/20; G06T 2207/10028; G06T 2200/08; G06T 7/001;
(Continued)

(56) References Cited

U.S. PATENT DOCUMENTS

| | | | |
|---|---|---|---|
| 3,778,170 A | 12/1973 | Howell | |
| 4,847,510 A | 7/1989 | Douglas | |

(Continued)

FOREIGN PATENT DOCUMENTS

| | | |
|---|---|---|
| CA | 2362712 | 8/2000 |
| CN | 102473308 | 5/2012 |

(Continued)

OTHER PUBLICATIONS

Lim Ser Nam et al: "Automatic Registration of Smooth Object Image to 3D CAD Model for Industrial Inspection Applications", 2013 International Conference on 3D Vision, IEEE, Jun. 29, 2013 (Jun. 29, 2013), pp. 79-86, XP032480418, DOI: 10.1109/3DV.2013. 19.

(Continued)

*Primary Examiner* — Matthew C Bella
*Assistant Examiner* — Janice E. Vaz
(74) *Attorney, Agent, or Firm* — Fitch, Even, Tabin & Flannery, LLP

(57) ABSTRACT

A method for inspecting an object includes determining a first inspection package that includes a first inspection image of the object and a first designation. The method includes determining data indicative of a second inspection package that includes a second inspection image of the object and a second designation. The method includes determining a first property of the object based on the first inspection image of the object, one or more properties maps of the object, and the first designation. The method includes determining a second property of the object based on the second inspection image of the object, the one or more properties maps of the object, and the second designation. The method includes displaying the first property and the second property or displaying data indicative of a comparison of the first property with the second property.

20 Claims, 13 Drawing Sheets

(58) Field of Classification Search

CPC . G06T 2207/30164; G06T 2207/20104; G06T 17/00; G06T 2219/00; G06T 19/003; G06T 19/00; G06T 7/74; G06T 7/70; G06T 2207/10068; G06T 2207/30108; G06T 7/0004; G06T 7/0002; G01B 11/2513; G01N 2021/8887; G01N 21/8803; G01N 21/88; F05D 2220/32; F01D 5/00; F01D 7/00

See application file for complete search history.

(56) References Cited

U.S. PATENT DOCUMENTS

| | | | | |
|---|---|---|---|---|
| 5,610,994 | A | 3/1997 | Stadtfeld et al. | |
| 6,665,441 | B1 | 12/2003 | Nishio | |
| 6,700,668 | B2 | 3/2004 | Mundy et al. | |
| 6,901,160 | B2 | 5/2005 | Chapman | |
| 6,987,876 | B2 | 1/2006 | Silber | |
| 7,033,979 | B2 | 4/2006 | Herwig | |
| 7,427,262 | B2 | 9/2008 | Bonningue | |
| 7,543,518 | B2 | 6/2009 | Buckingham | |
| 8,028,936 | B2 | 10/2011 | Mcdermott | |
| 8,069,747 | B2 | 12/2011 | Buckingham | |
| 8,144,411 | B2 | 3/2012 | Yazdanfar | |
| 8,194,948 | B2 | 6/2012 | Hori | |
| 8,200,042 | B2 | 6/2012 | Doi et al. | |
| 8,238,642 | B2 | 8/2012 | Wu | |
| 8,248,465 | B2 | 8/2012 | Doi | |
| 8,277,647 | B2 | 10/2012 | Rice | |
| 8,285,362 | B2 | 10/2012 | Dietz | |
| 8,480,563 | B2 | 7/2013 | Nakano | |
| 8,493,558 | B2 | 7/2013 | Asada | |
| 8,558,879 | B2 | 10/2013 | Doi | |
| 8,562,516 | B2 | 10/2013 | Saadat | |
| 8,602,722 | B2 | 12/2013 | George | |
| 8,768,046 | B2 | 7/2014 | Ernst et al. | |
| 8,913,110 | B2 | 12/2014 | Hori et al. | |
| 8,965,103 | B2 | 2/2015 | Hori | |
| 9,036,142 | B2 | 5/2015 | Ahner | |
| 9,046,496 | B2 | 6/2015 | Tsai | |
| 9,138,782 | B2 | 9/2015 | Dorshimer | |
| 9,251,582 | B2 | 2/2016 | Lim | |
| 9,271,637 | B2 | 3/2016 | Farr | |
| 9,275,473 | B2 | 3/2016 | Hori | |
| 9,300,926 | B2 | 3/2016 | Kell et al. | |
| 9,392,230 | B2 | 7/2016 | Yokota | |
| 9,412,189 | B2 | 8/2016 | Bendall et al. | |
| 9,739,168 | B2 | 8/2017 | Ekanayake | |
| 9,926,517 | B2 | 3/2018 | Tibbetts | |
| 9,932,854 | B1 | 4/2018 | Tibbetts | |
| 9,939,386 | B2 | 4/2018 | Lewis | |
| 9,951,647 | B2 | 4/2018 | Rawson | |
| 9,957,066 | B2 | 5/2018 | Bewlay | |
| 9,984,474 | B2 | 5/2018 | Bendall | |
| 10,005,111 | B2 | 6/2018 | Eriksen | |
| 10,018,113 | B2 | 7/2018 | Bewlay | |
| 10,074,169 | B2 | 9/2018 | Niedermeier | |
| 10,104,313 | B2 | 10/2018 | Slavens et al. | |
| 10,126,117 | B1 | 11/2018 | Byers | |
| 10,147,176 | B1 | 12/2018 | Sones | |
| 10,227,891 | B2 | 3/2019 | Eriksen | |
| 10,255,519 | B2 | 4/2019 | Nagatomo et al. | |
| 10,290,113 | B2 | 5/2019 | Akagi | |
| 10,294,492 | B2 | 5/2019 | Ramírez Martínez | |
| 10,323,539 | B2 | 6/2019 | Bewlay | |
| 10,377,968 | B2 | 8/2019 | Brooks | |
| 10,385,723 | B2 | 8/2019 | Flynn | |
| 10,504,220 | B2 * | 12/2019 | Lim | G06T 7/0008 |
| 10,536,617 | B2 | 1/2020 | Liang | |
| 10,564,111 | B2 | 2/2020 | Safai | |
| 10,634,004 | B2 | 4/2020 | Giljohann | |
| 10,636,148 | B1 | 4/2020 | Chen | |
| 10,641,622 | B2 | 5/2020 | Sternklar | |
| 10,669,885 | B2 | 6/2020 | Pecchiol | |
| 10,693,479 | B2 | 6/2020 | Jenkins | |
| 10,699,149 | B2 | 6/2020 | Bendall | |
| 10,740,913 | B2 | 8/2020 | Shi et al. | |
| 10,742,958 | B2 | 8/2020 | Yamamoto | |
| 10,775,315 | B2 | 9/2020 | Mekala | |
| 10,835,102 | B2 | 11/2020 | Ganapati | |
| 10,909,702 | B2 | 2/2021 | Ono | |
| 10,920,181 | B2 | 2/2021 | Martin | |
| 11,022,560 | B2 | 6/2021 | Kato | |
| 11,027,317 | B2 | 6/2021 | Tibbetts | |
| 11,084,169 | B2 | 8/2021 | Graham | |
| 11,116,050 | B1 | 9/2021 | Bhogal | |
| 11,143,357 | B2 | 10/2021 | Zhang | |
| 11,213,615 | B2 | 1/2022 | Xing | |
| 11,288,789 | B1 * | 3/2022 | Chen | G06T 7/001 |
| 11,410,298 | B2 * | 8/2022 | Finn | G01B 21/00 |
| 11,441,446 | B2 | 9/2022 | Rawson | |
| 11,994,476 | B2 | 5/2024 | Li | |
| 2001/0030744 | A1 | 10/2001 | Chang | |
| 2002/0009218 | A1 | 1/2002 | Chapman | |
| 2002/0193664 | A1 | 12/2002 | Ross | |
| 2003/0234941 | A1 | 12/2003 | Mundy | |
| 2005/0234296 | A1 | 10/2005 | Saadat | |
| 2005/0281520 | A1 | 12/2005 | Kehoskie | |
| 2005/0288555 | A1 | 12/2005 | Binmoeller | |
| 2006/0183977 | A1 | 8/2006 | Ishigami | |
| 2008/0240491 | A1 | 10/2008 | Hori | |
| 2009/0092278 | A1 | 4/2009 | Doi et al. | |
| 2009/0167847 | A1 | 7/2009 | Doi | |
| 2010/0128115 | A1 | 5/2010 | Nakano | |
| 2010/0150406 | A1 | 6/2010 | Xiao | |
| 2010/0158362 | A1 | 6/2010 | Lang | |
| 2011/0018987 | A1 | 1/2011 | Doi | |
| 2011/0221877 | A1 | 9/2011 | Hori et al. | |
| 2012/0019653 | A1 | 1/2012 | Hori | |
| 2012/0327252 | A1 | 12/2012 | Nichols | |
| 2013/0093866 | A1 | 4/2013 | Ohlhues | |
| 2013/0135457 | A1 | 5/2013 | Kell et al. | |
| 2014/0002630 | A1 | 1/2014 | Yokota | |
| 2014/0055604 | A1 | 2/2014 | Delaney | |
| 2014/0098091 | A1 | 4/2014 | Hori | |
| 2014/0133697 | A1 | 5/2014 | Singamsetti | |
| 2014/0152790 | A1 | 6/2014 | Saito | |
| 2014/0163717 | A1 | 6/2014 | Das | |
| 2014/0207419 | A1 | 7/2014 | Messinger | |
| 2015/0159122 | A1 | 6/2015 | Tibbetts | |
| 2015/0168263 | A1 * | 6/2015 | Mueller | F01D 21/003 348/82 |
| 2015/0317816 | A1 | 11/2015 | Bendall et al. | |
| 2016/0073855 | A1 | 3/2016 | Farr | |
| 2016/0221262 | A1 | 8/2016 | Das | |
| 2016/0266046 | A1 | 9/2016 | Kuai | |
| 2016/0284084 | A1 | 9/2016 | Gurcan | |
| 2016/0284103 | A1 | 9/2016 | Huang | |
| 2017/0165721 | A1 | 6/2017 | Tibbetts | |
| 2017/0167290 | A1 | 6/2017 | Kulkarni | |
| 2017/0191376 | A1 | 7/2017 | Eriksen | |
| 2017/0204739 | A1 | 7/2017 | Rawson | |
| 2017/0254217 | A1 | 9/2017 | Eriksen | |
| 2017/0318205 | A1 | 11/2017 | Duckett, III | |
| 2018/0003161 | A1 | 1/2018 | Michini | |
| 2018/0013959 | A1 * | 1/2018 | Slavens | H04N 23/23 |
| 2018/0103246 | A1 | 4/2018 | Yamamoto | |
| 2018/0114304 | A1 * | 4/2018 | Chen | G06T 7/001 |
| 2018/0149038 | A1 | 5/2018 | Eriksen | |
| 2018/0155060 | A1 | 6/2018 | Dauenhauer | |
| 2018/0180534 | A1 | 6/2018 | Noda | |
| 2018/0216036 | A1 | 8/2018 | Tibbetts | |
| 2018/0237163 | A1 | 8/2018 | Bewlay | |
| 2018/0245477 | A1 | 8/2018 | Kulkarni | |
| 2018/0258787 | A1 | 9/2018 | Tibbetts | |
| 2018/0289240 | A1 | 10/2018 | Aoyama | |
| 2018/0291803 | A1 | 10/2018 | Belay | |
| 2018/0298781 | A1 | 10/2018 | Tibbetts | |
| 2018/0313225 | A1 | 11/2018 | Millhaem | |
| 2018/0355751 | A1 | 12/2018 | Tibbetts | |
| 2019/0153890 | A1 | 5/2019 | Eriksen | |
| 2019/0220968 | A1 | 7/2019 | Kato | |
| 2019/0228514 | A1 * | 7/2019 | Hestand | G06T 7/62 |
| 2019/0279380 | A1 | 9/2019 | Bendall | |

(56) References Cited

U.S. PATENT DOCUMENTS

| | | | |
|---|---|---|---|
| 2019/0285980 A1 | 9/2019 | Yoshikawa | |
| 2019/0323378 A1 | 10/2019 | Tibbetts | |
| 2019/0330997 A1 | 10/2019 | Norton | |
| 2019/0338666 A1 | 11/2019 | Finn | |
| 2019/0339165 A1 | 11/2019 | Finn | |
| 2019/0340805 A1 | 11/2019 | Xiong | |
| 2019/0362486 A1 | 11/2019 | Diao | |
| 2020/0056501 A1 | 2/2020 | Eastment | |
| 2020/0082526 A1 | 3/2020 | Murphy | |
| 2020/0213563 A1 | 7/2020 | Morice | |
| 2020/0319119 A1 | 10/2020 | Peters | |
| 2020/0346310 A1 | 11/2020 | Huttner | |
| 2021/0108537 A1 | 4/2021 | Rigg | |
| 2021/0132598 A1 | 5/2021 | Schleif | |
| 2021/0172837 A1 | 6/2021 | Pulisciano | |
| 2021/0281748 A1* | 9/2021 | Nogami | H04N 23/631 |
| 2021/0312702 A1* | 10/2021 | Holzer | G06Q 10/20 |
| 2021/0317752 A1 | 10/2021 | Deja | |
| 2021/0396683 A1 | 12/2021 | Zhang | |
| 2022/0051395 A1 | 2/2022 | Vandam | |
| 2022/0061638 A1 | 3/2022 | Hinding | |
| 2022/0314430 A1 | 10/2022 | Graham | |
| 2022/0358638 A1 | 11/2022 | Ojima | |
| 2023/0000328 A1 | 1/2023 | Govrin | |
| 2023/0016982 A1 | 1/2023 | Graham | |
| 2023/0018458 A1 | 1/2023 | Graham | |
| 2023/0334644 A1 | 10/2023 | Ojima | |
| 2024/0159711 A1 | 5/2024 | Kommareddy | |
| 2024/0163537 A1 | 5/2024 | Kommareddy | |

FOREIGN PATENT DOCUMENTS

| | | |
|---|---|---|
| CN | 102944928 | 2/2013 |
| CN | 102944928 B | 7/2015 |
| CN | 105960569 | 9/2016 |
| CN | 106416225 | 2/2017 |
| CN | 106934794 | 7/2017 |
| CN | 110047103 | 7/2019 |
| CN | 111433574 | 7/2020 |
| CN | 112136154 | 12/2020 |
| CN | 214368947 | 10/2021 |
| CN | 214965296 | 12/2021 |
| DE | 102013202616 A1 | 8/2014 |
| DE | 102015006330 | 11/2016 |
| EP | 2170565 | 4/2010 |
| EP | 3643451 | 4/2020 |
| EP | 3643452 | 4/2020 |
| FR | 2965388 B1 | 10/2012 |
| JP | 2009168499 A | 7/2009 |
| JP | 2009282379 A | 12/2009 |
| JP | 2010008394 A | 1/2010 |
| JP | 2011161019 A | 8/2011 |
| JP | 5186314 B2 | 4/2013 |
| JP | 2013059664 | 4/2013 |
| JP | 5307407 B2 | 10/2013 |
| JP | 5361246 B2 | 12/2013 |
| JP | 5390011 | 1/2014 |
| JP | 5602449 B2 | 10/2014 |
| JP | 2017040932 A | 2/2017 |
| JP | 6373322 B2 | 8/2018 |
| JP | 6810711 | 1/2021 |
| WO | 2009144729 | 12/2009 |
| WO | 2020022474 A1 | 1/2020 |
| WO | 2020030516 A1 | 2/2020 |
| WO | 2020110576 | 6/2020 |
| WO | 2020219076 | 10/2020 |
| WO | 2021094534 | 5/2021 |

OTHER PUBLICATIONS

USPTO; U.S. Appl. No. 17/985,459; Application filed Nov. 11, 2022, entitled "Inspection Systems and Methods Employing Directional Light for Enhanced Imaging".

USPTO; U.S. Appl. No. 17/985,501; Application filed Nov. 11, 2022, entitled "Inspection Systems and Methods Employing Different Wavelength Directional Light for Enhanced Imaging".

USPTO; U.S. Appl. No. 17/373,920; Final Rejection mailed Feb. 12, 2024; (pp. 1-20).

USPTO; U.S. Appl. No. 17/373,917; Non-Final Rejection mailed Nov. 16, 2023; (pp. 1-16).

USPTO; U.S. Appl. No. 17/373,920; Non-Final Rejection mailed Sep. 28, 2023; (pp. 1-17).

USPTO; U.S. Appl. No. 17/373,917; Non-Final Rejection mailed Aug. 1, 2024; (pp. 1-25).

USPTO; U.S. Appl. No. 17/373,917; Final Rejection mailed Apr. 16, 2024; (pp. 1-22).

USPTO; U.S. Appl. No. 17/373,920; Non-Final Rejection mailed Jun. 7, 2024; (pp. 1-20).

Jason Geng: "Structured-light 3D surface imaging: a tutorial", Advances in Optics and Photonics, vol. 3, No. 2, Mar. 31, 2011 (Mar. 31, 2011), p. 128-160, XP055033088, DOI: 10.1364/AOP.3.000128.

USPTO; U.S. Appl. No. 17/373,920; Final Rejection mailed Nov. 4, 2024; (pp. 1-24).

USPTO; U.S. Appl. No. 17/985,459; Non-Final Rejection mailed Sep. 20, 2024; (pp. 1-22).

USPTO; U.S. Appl. No. 17/985,501; Non-Final Rejection mailed May 14, 2025; (pp. 1-44).

Waygate Technologies Brochure: Everest Mentor Visual iQ+ VideoProbe; 12 pgs.; Oct. 2024; (extension ://efaidnbmnn-nibpcajpcglclefindmkaj/https://dam.bakerhughes.com/m/206c48e427981e2f/original/BHCS33632B-Mentor-ViC-Brochure_R8-pdtpdf).

USPTO; U.S. Appl. No. 17/373,917; Final Rejection mailed Feb. 14, 2025; (pp. 1-23).

USPTO; U.S. Appl. No. 17/373,920; Non-Final Rejection mailed Feb. 11, 2025; (pp. 1-26).

USPTO; U.S. Appl. No. 17/985,459; Final Rejection mailed Jan. 15, 2025; (pp. 1-17).

USPTO; U.S. Appl. No. 17/985,459; Non-Final Rejection mailed Mar. 27, 2025; (pp. 1-17).

Waygate Technologies Brochure: Everest Mentor Visual iQ+ VideoProbe; 12 pgs.; Oct. 2024; (extension://efaidnbmnn-nibpcajpcglclefindmkaj/https://dam.bakerhughes.com/m/206c48e427981e2f/original/BHCS33632B-Mentor-ViQ-Brochure_R8-pdf.pdf).

Waygate Technologies, Everest Mentor Visual iQ+ VideoProbe product specification, Jan. 2024, 12 pp.

USPTO; U.S. Appl. No. 17/373,920; Final Rejection mailed Jun. 4, 2025; (pp. 1-28).

USPTO; U.S. Appl. No. 17/985,501; Non-Final Rejection mailed May 14, 2025; (pp. 1-14).

USPTO; U.S. Appl. No. 17/985,459; Notice of Allowance mailed Jul. 1, 2025; (pp. 1-8).

USPTO; U.S. Appl. No. 17/985,459; Notice of Allowance and Fees Due (PTOL-85) mailed Jul. 1, 2025; (pp. 1-8).

USPTO; U.S. Appl. No. 17/373,917; Non-Final Rejection mailed Aug. 11, 2025; (pp. 1-23).

USPTO; U.S. Appl. No. 17/373,920; Notice of Allowance and Fees Due (PTOL-85) mailed Oct. 1, 2025; (pp. 1-13).

USPTO; U.S. Appl. No. 17/985,501; Final Rejection mailed Nov. 13, 2025; (pp. 1-12).

USPTO; U.S. Appl. No. 17/985,459; Notice of Allowance and Fees Due (PTOL-85) mailed Nov. 26, 2025; (pp. 1-8).

USPTO; U.S. Appl. No. 17/373,917; Notice of Allowance and Fees Due (PTOL-85) mailed Jan. 28, 2026; (pp. 1-12).

USPTO; U.S. Appl. No. 17/985,501; Notice of Allowance and Fees Due (PTOL-85) mailed Jan. 28, 2026; (pp. 1-8).

USPTO; U.S. Appl. No. 17/985,459; Notice of Allowance and Fees Due (PTOL-85) mailed Jan. 29, 2026; (pp. 1-8).

USPTO; U.S. Appl. No. 17/373,920; Notice of Allowance and Fees Due (PTOL-85) mailed Feb. 9, 2026; (pp. 1-11).

* cited by examiner

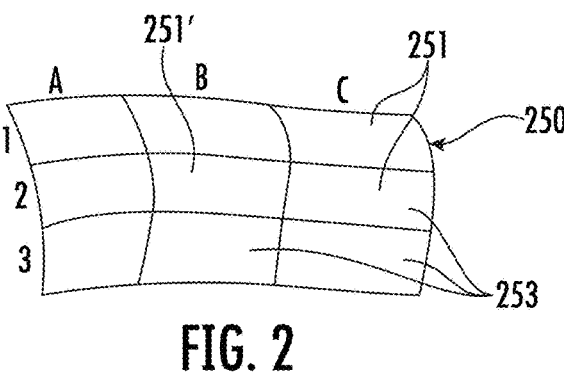

FIG. 2

| ADJACENT PIXEL | DISTANCE |
|---|---|
| A1 | .42 mm |
| A2 | .31 mm |
| A3 | .40 mm |
| B1 | .26 mm |
| B3 | .28 mm |
| C1 | .45 mm |
| C2 | .34 mm |
| C3 | .48 mm |

FIG. 3A

| PIXEL PROPERTY | VALUE |
|---|---|
| B2 AREA: | .096 mm2 |
| B2 SURFACE INCLINATION (X, Y) | (1.4, 5.1) |
| B2 COLOR (RGB) | (143, 146, 148) |
| ANGLE OF RAY TO CENTER OF PIXEL (X, Y) | (0.8, 1.3) |
| LENGTH OF RAY TO CENTER OF PIXEL | 0.30 m |
| COOLING HOLE (Y/N) | NO |
| LOCATION CATEGORIZATION | LEADING EDGE OF BLADE |
| B2 WIDTH AT CENTER | 0.33 mm |
| B2 HEIGHT AT CENTER | 0.25 mm |
| DISTANCE FROM CENTER TO TOP-LEFT CORNER | 0.20 mm |
| DISTANCE FROM CENTER TO TOP SIDE | 0.12 mm |
| DISTANCE FROM CENTER OF TOP SIDE TO TOP-LEFT CORNER | 0.16 mm |
| . . . | . . . |

510 — OBTAIN AN INSPECTION IMAGE OF AN OBJECT.

520 — CREATE A SIMPLIFIED IMAGE OF THE INSPECTION IMAGE.

530 — ESTIMATE AN ORIENTATION OF THE OBJECT.

600

DETERMINE GUIDE IMAGE DATA OF AN
OBJECT FROM A DETERMINED ORIENTATION.  ───610

↓

RECEIVE INSPECTION IMAGE DATA.  ───620

↓

ASSOCIATE THE INSPECTION IMAGE DATA WITH
THE GUIDE IMAGE DATA.  ───630

↓

DETERMINE A PROPERTY OF THE OBJECT BASED ON
THE GUIDE IMAGE DATA AND THE ASSOCIATED
INSPECTION IMAGE DATA.  ───640

400

700

451

720    710

X

Y

X

Y

720

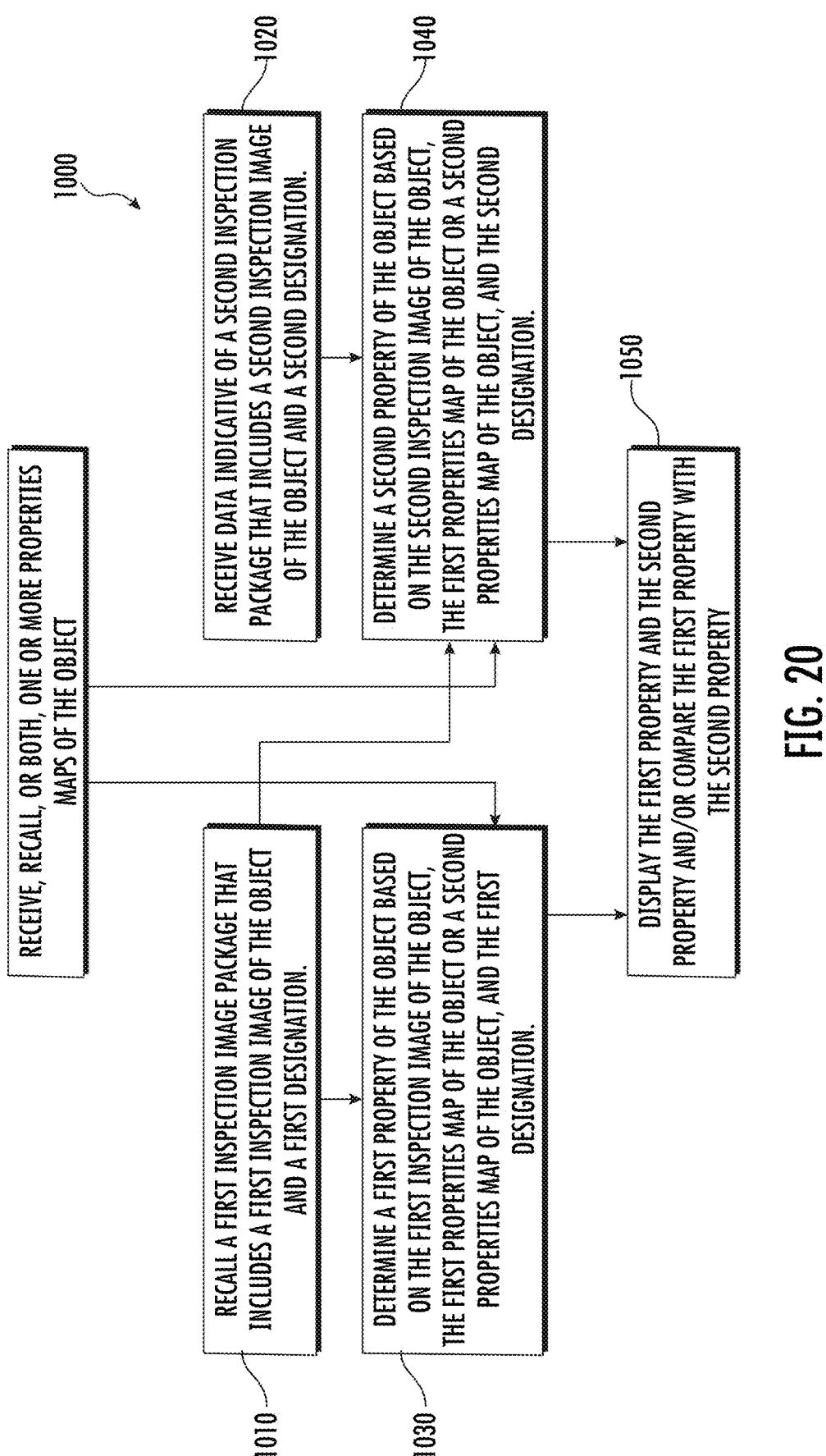

1000

RECEIVE, RECALL, OR BOTH, ONE OR MORE PROPERTIES MAPS OF THE OBJECT

RECALL A FIRST INSPECTION IMAGE PACKAGE THAT INCLUDES A FIRST INSPECTION IMAGE OF THE OBJECT AND A FIRST DESIGNATION.
1010

RECEIVE DATA INDICATIVE OF A SECOND INSPECTION PACKAGE THAT INCLUDES A SECOND INSPECTION IMAGE OF THE OBJECT AND A SECOND DESIGNATION.
1020

DETERMINE A FIRST PROPERTY OF THE OBJECT BASED ON THE FIRST INSPECTION IMAGE OF THE OBJECT, THE FIRST PROPERTIES MAP OF THE OBJECT OR A SECOND PROPERTIES MAP OF THE OBJECT, AND THE FIRST DESIGNATION.
1030

DETERMINE A SECOND PROPERTY OF THE OBJECT BASED ON THE SECOND INSPECTION IMAGE OF THE OBJECT, THE FIRST PROPERTIES MAP OF THE OBJECT OR A SECOND PROPERTIES MAP OF THE OBJECT, AND THE SECOND DESIGNATION.
1040

DISPLAY THE FIRST PROPERTY AND THE SECOND PROPERTY AND/OR COMPARE THE FIRST PROPERTY WITH THE SECOND PROPERTY
1050

FIG. 20

METHOD FOR INSPECTING AN OBJECT

FIELD

The present disclosure relates to a method for inspecting an object, such as a method for inspecting a gas turbine engine part using a visual image recording device.

BACKGROUND

Known methods of inspecting an object include the use of a visual image recording device, such as a camera, to generate one or more inspection images and the use of a 3D model of the object. In such a manner, these known inspection methods generally require access to the 3D model of the object in order to complete the inspection.

BRIEF DESCRIPTION OF THE DRAWINGS

A full and enabling disclosure, including the best mode thereof, directed to one of ordinary skill in the art, is set forth in the specification, which makes reference to the appended figures, in which:

FIG. 2 is a portion of a guide image pixel array in accordance with an exemplary embodiment of the present disclosure.

FIG. 3A is a table displaying a plurality of pixel properties for the guide image pixel of FIG. 2 in accordance with an exemplary embodiment of the present disclosure.

FIG. 3B is a table displaying pixel properties for the guide image pixel of FIG. 2 in accordance with an exemplary embodiment of the present disclosure.

FIG. 20 is a flow chart diagram illustrating a method for comparing a first property of an object with a second property of the object in accordance with an exemplary embodiment of the present disclosure.

DETAILED DESCRIPTION

Figure 1A:
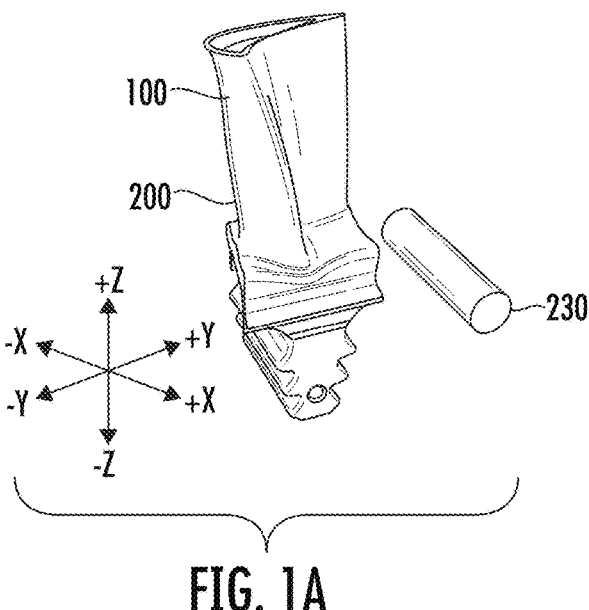
FIG. 1A is a perspective view of a three-dimensional (3D) model of an object and a virtual visual image recording device in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The inventors of the present disclosure have found that it may be beneficial to be able to inspect an object without access to the 3D model of the object. Improved inspection methods would be welcomed in the field of component inspection.

In accordance with one or more embodiments described herein, a method for inspecting an object is provided. The method includes determining guide image data of the object from a determined orientation, the guide image data including a guide image pixel array and a pixel property for at least one guide image pixel in the guide image pixel array. The method also includes receiving inspection image data indicative of an inspection image. The method also includes associating the inspection image data with the guide image data and determining a property of the object based on the guide image data and the associated inspection image data. Determining the property of the object based on the guide image data and the associated inspection image data has several benefits.

First, determining the property of the object based on the guide image data and the associated inspection image data may make it possible to inspect the object without the use of a 3D model of the object, e.g., after having determined guide image data for the object. For example, and as will be described in more detail, guide image data can be determined from the 3D model for a determined orientation of the object. Once the guide image data is determined, the 3D model is no longer needed to determine the property of the object. As such, if guide image data is determined, the object can be inspected without using, viewing, or sharing the 3D model of the object.

Inspecting the object without using, viewing, or sharing the 3D model of the object has several benefits. For example, the information within the 3D model may be proprietary information that is undesirable to disclose to third parties, such as a user that is inspecting the object. Also, certain countries may have export compliance laws that may prohibit the export of the 3D model outside of the country without an export license. However, it may be acceptable to share guide image data, which is information related to the 3D model of the object.

Second, determining the property of the object based on the guide image data and the associated inspection image data can reduce the amount of time to perform an inspection of an object. For example, known inspection methods involve overlaying inspection images onto 3D models and manually matching features between the inspection images and the 3D models. Such overlaying, comparison, and matching directly to the 3D model may be very time consuming. A such, determining the property of the object based on the guide image data and the associated inspection image data can reduce the amount of time to perform an inspection.

In accordance with one or more embodiments described herein, a method for inspecting an object is provided. The method includes determining inspection image data, the inspection image data including an inspection image pixel array with each inspection image pixel in the inspection image pixel array having a pixel property associated therewith. The method also includes receiving a user input associated with a continuous segment of inspection image pixels in the inspection image pixel array. The method also includes determining a property of the object based on the pixel properties associated with the continuous segment of inspection image pixels in the inspection image pixel array. Determining the property of the object based on the pixel properties associated with the received user input associated with the continuous segment of inspection image pixels in the inspection image pixel array has many benefits.

First, determining the property of the object based on the pixel properties associated with the received user input associated with the continuous segment of inspection image pixels in the inspection image pixel array may have the benefit of the ability to compare a property of the object to a threshold value. For example, the received user input may be associated with a feature on an object. In some examples, the feature can be damage to the object, such as a crack or chip on the object or a spalling location of a coating on the object. As such, it may be beneficial to measure the feature to determine whether it is within an acceptable range. For example, cracks under a certain length may be acceptable. However, cracks over a certain length may require the object to be repaired or replaced.

Second, determining the property of the object based on the pixel properties associated with the received user input associated with the continuous segment of inspection pixels in the inspection image pixel array may have the benefit of the ability to track and compare the location or measurement of certain features, such as damage to the object, between different objects. For example, the object may be a rotor blade and the user input may be associated with a crack on the rotor blade. The determined property of the object may be the length of the crack and the location of the crack on the rotor blade. In one or more other inspection events to inspect other rotor blades, the user input may also be associated with cracks on the rotor blades and the determined property of the object may also be the length of the crack and the location of the crack on the rotor blade. The crack size and location of cracks on different rotor blades can be analyzed to determine trends. For example, an analysis may be performed that determines that the most likely location for a crack on a rotor blade.

In accordance with one or more embodiments described herein, a method for inspecting an object is provided. The method includes recalling a first inspection package that includes a first inspection image of the object and a first designation. The method also includes receiving data indicative of a second inspection package that includes a second inspection image of the object and a second designation. The method also includes receiving, recalling, or both, one or more properties maps of the object. The method also includes determining a first property of the object based on the first inspection image of the object, the one or more properties maps of the object, and the first designation. The method also includes determining a second property of the object based on the second inspection image of the object, the one or more properties maps of the object, and the second designation. The method also includes displaying the first property and the second property and/or comparing the first property with the second property.

In certain aspects, the method includes receiving or recalling a first properties map and receiving or recalling a second properties map. In such a case, the method may determine the first property of the object based on the first properties map and similarly may determine the second property of the object based on the second properties map.

In certain aspects, the method includes receiving or recalling a second properties map. In such a case, the method may determine the first property of the object based on the second properties map and similarly may determine the second property of the object based on the second properties map.

The method also includes displaying or comparing the first property with the second property. Displaying or comparing the first property with the second property has several benefits.

First, displaying or comparing the first property with the second property may make it possible to inspect the object without the use of a 3D model of the object. For example, the first property is determined based on the first or second properties map of the object, and the second property is similarly determined based on the first or second properties map of the object. The first properties map and the second properties map can be determined from the 3D model for a determined orientation of the object. Once the first and/or second properties maps are determined, the 3D model is no longer needed to determine the first property or the second property of the object.

Inspecting the object without using, viewing, or sharing the 3D model of the object has several benefits. For example, the information within the 3D model may be proprietary information that is undesirable to disclose to third parties, such as a user that is inspecting the object. Also, certain countries may have export compliance laws that may prohibit the export of the 3D model outside of the country without an export license. However, it may be acceptable to share pixel properties, which is information related to the 3D model of the object.

Second, displaying or comparing the first property with the second property may reduce the amount of time to perform an inspection of an object. For example, known inspection methods involve overlaying inspection images onto 3D models and manually matching features between the inspection images and the 3D models. Such overlaying, comparison, and matching directly to the 3D model may be very time consuming. As such, because the first property and the second property are determined based on the first properties map of the object or the second properties map of the object, and not the 3D model, comparing the first property with the second property may reduce the amount of time to perform an inspection.

Third, displaying or comparing the first property with the second property may allow the measurement of a feature on an object over time. In some examples, the feature can be damage to the object, such as a crack or chip on the object or a spalling location of a coating on the object. As such, it may be beneficial to measure the size of the feature to determine whether it is within an acceptable range. For example, cracks under a certain length may be acceptable. Additionally, it may be beneficial to measure the feature at two different points in time, such as two different points in time that are at least three months apart and up to twenty years apart, to determine whether the feature is growing and project when the feature will grow to exceed an acceptable size. In yet another example, the feature, such as a crack, can be measured and compared on different objects so that a trend analysis can be performed. For example, it may be useful to analyze the data to determine the most likely location of a crack or the most likely size of a crack.

Fourth, in some examples, determining the first property of the object and the second property of the object are both based on the second properties map of the object. This may ensure an apples-to-apples comparison of the first property with the second property. This may be important when an algorithm to determine the first properties map differs from an algorithm to determine the second properties map. Because algorithms may change over time due to optimizations or improvements to the algorithm, the first properties map may differ from the second properties map. Because the first properties map may differ from the second properties map, it may be beneficial to redetermine the first property with the second properties map of the object (using the first inspection image and first designation) to ensure an apples-to-apples comparison to the second property. Notably, in this scenario, the 3D model is not needed.

Referring to the drawings, wherein identical numerals indicate the same elements throughout the figures, FIG. 1A provides a perspective view of a three-dimensional (3D) model 200 (also referred to as a "computer model") of an object 100 and a virtual visual image recording device 230 in accordance with an exemplary embodiment of the present disclosure. As used herein, an "object" can be a component, a portion of a component, an assembly that includes a plurality of components, or a portion of an assembly. Even though shown as a black and white drawing in the figures, it should be understood that the 3D model 200 may be a shaded 3D model, such as a 3D model 200 with a grayscale color scheme, to provide additional visual details, such as the curvatures of the component. In one example, the 3D model 200 can be created with the use of 3D modeling software. For example, the 3D model 200 can be created with computer-aided design (CAD) software. In another example, the 3D model 200 can be created by 3D scanning a real-world object, such as a control object. A control object can be a specimen with known dimensions and/or qualities. The virtual visual image recording device 230 can represent any suitable imaging device including any optical sensor capable of capturing still or moving images, such as a camera. Suitable types of cameras may be a CMOS camera, a CCD camera, a digital camera, a video camera or any other type of device capable of capturing an image. It is further contemplated that a borescope camera or an endoscope camera can be utilized. Further still, the visual image recording device may be a monocular camera or a binocular camera.

The 3D object 100 may be positioned in a "pose" in front of the virtual visual image recording device 230. More specifically, the 3D object 100 may be positioned in a determined orientation. As used herein, "orientation" refers to the physical position of an object 100. For example, "orientation" can refer to the relative position of one object 100 relative to another object 100. For example, as used in reference to FIG. 1A, the determined orientation refers to the relative physical position of the 3D object 100 relative to the virtual visual image recording device 230. Alternatively, or in addition, "orientation" can refer to the six degrees of freedom positioning-position on the X-axis (surge), position on the Y-axis (sway), position on the Z-axis (heave), tilt on the X-axis (roll), tilt on the Y-axis (pitch), and tilt on the Z-axis (yaw).

Figures 1B, 1C:
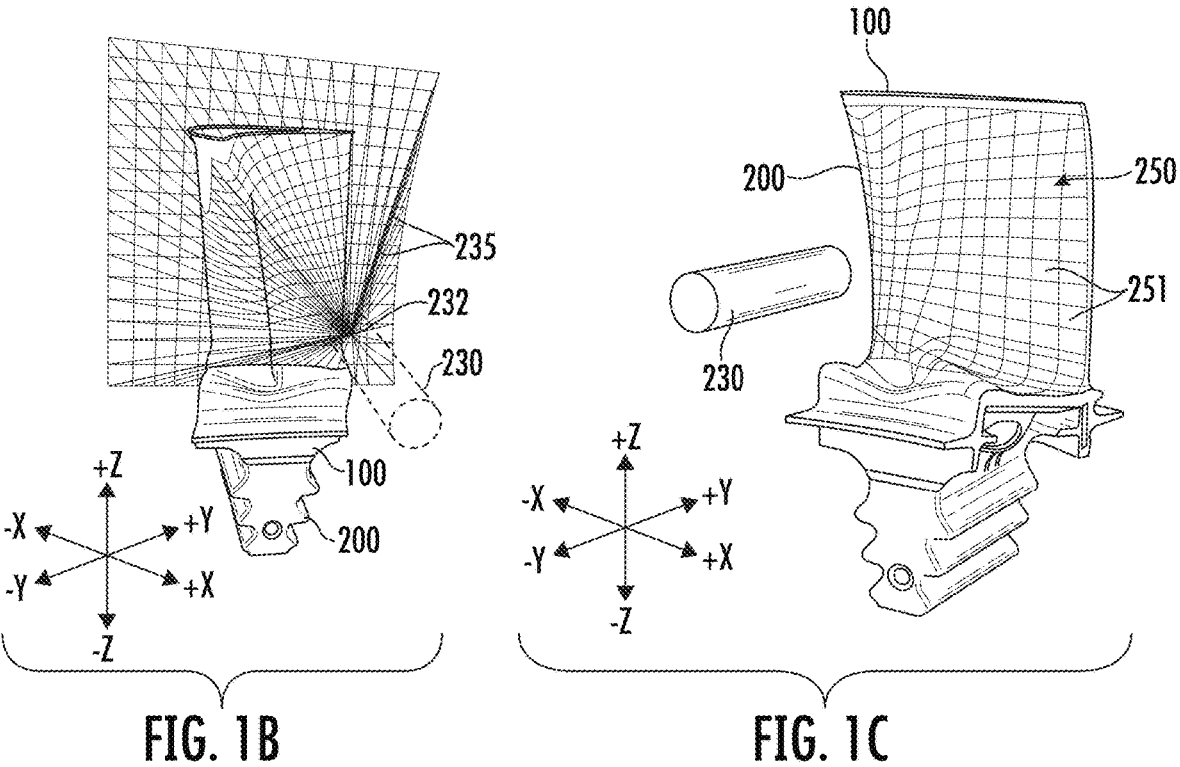
FIG. 1B is a perspective view of the 3D model of the object and the virtual visual image recording device of FIG. 1A in accordance with an exemplary embodiment of the present disclosure.
FIG. 1C is a perspective view of the 3D model of the object and the virtual visual image recording device of FIG. 1A in accordance with an exemplary embodiment of the present disclosure.

Referring to FIG. 1B, a perspective view of the 3D model 200 of the object 100 and the virtual visual image recording device 230 of FIG. 1A is provided in accordance with an exemplary embodiment of the present disclosure. As shown, a plurality of rays 235 may be cast from a location associated with the virtual visual image recording device 230. Even though a virtual visual image recording device 230 is depicted, it should be understood that a virtual visual image recording device 230 is not required. For example, the rays 235 could be cast from a specific point 232 that is in a particular location relative to the object 100.

Referring to FIG. 1C, a perspective view of the 3D model 200 of the object 100 and the virtual visual image recording device 230 of FIG. 1A is provided in accordance with an exemplary embodiment of the present disclosure. The plurality of rays 235 (FIG. 1B) that are cast onto the object 100 create an array of guide image pixels 251, a guide image pixel array 250. Each of the guide image pixels 251 are subdivisions of the surface of the object 100 that are created by the rays 235. It should be understood that the size of each of the guide image pixels 251 are exaggerated for clarity in the figures. For example, the guide image pixels 251 can range in size from about 0.05 millimeter to about 5 millimeters.

As seen in this view, at least some, and sometimes all, of the guide image pixels 251 may be irregular shapes such that they have sides and angles of any shape and size. Also, the shape and size of the sides and angles may differ among the guide image pixels 251 of the guide image pixel array 250. For example, the shape of each of the guide image pixels 251 may be dependent on the location and shape of the surface of the object 100 that the corresponding rays 235 are cast upon.

Referring to FIG. 2, a portion of a guide image pixel array 250 is provided in accordance with an exemplary embodiment of the present disclosure. The guide image pixel array 250 can include a plurality of guide image pixels 251. Even though only nine guide image pixels 251 are shown in this view, the guide image pixel array 250 can include any number of guide image pixels 251. For example, the guide image pixel array 250 can include more than five hundred thousand guide image pixels 251, such as more than one million guide image pixels 251, such as more than two million guide image pixels 251, and up to one hundred million guide image pixels 251. The number of guide image pixels 251 within the guide image pixel array 250 may be dependent on a variety of factors such as user preferences, computing power, screen resolution, size of the object 100, cast location of the rays 235, and/or the number of rays 235.

Each guide image pixel 251 within a guide image pixel array 250 can have another guide image pixel 251 that is adjacent to it, which is an adjacent guide image pixel 253. An adjacent guide image pixel 253 is a guide image pixel 251 that shares a common side with another guide image pixel 251. For example, in the example of FIG. 2, guide image pixel 251', which is guide image pixel B2 (column, row location), has eight adjacent guide image pixels 253: A1, A2, A3, B1, B3, C1, C2, and C3 (column, row location). Referring to FIG. 3A, a table 260 displaying a plurality of pixel properties 252 for guide image pixel 251' of FIG. 2 is provided in accordance with an exemplary embodiment of the present disclosure. In particular, for the embodiment of FIG. 3A, the table 260 is a plurality of pixel properties 252 for guide image pixel 251' at location B2 in FIG. 2. One or more pixel properties 252 for at least one of the guide image pixels 251 within the guide image pixel array 250 can be determined. In some examples, one or more pixel properties 252 for each of the guide image pixels 251 within the guide image pixel array 250 can be determined. A "properties map", as used herein, refers to the one or more pixel properties 252 for the at least one of the guide image pixels 251 within the guide image pixel array 250 for an object 100. The pixel property 252 can be determined by, for example, deciding, calculating, estimating, or measuring. As will be explained in more detail, a pixel property 252 can be information that relates to the guide image pixel 251. For example, a pixel property 252 can be a dimension, a distance, a location, a feature, a color, a surface inclination, a categorization, a threshold value, a criticality, etc. When the pixel property 252 is a distance, the distance can be a Euclidian or a Geodesic distance. When the pixel property 252 is a distance or a dimension, the measurement, calculation, or estimation can account for the topology of the 3D object 100. The pixel property 252 can be a numerical value, a text value, a binary value, a quantitative value, a qualitative value, a categorical value, a symbolic value, or a combination thereof, to name a few examples. In some examples, a pixel property 252 for a guide image pixel 251 may not be available or exist. When a pixel property 252 is not available or does not exist, the pixel property 252 may be represented as a '0' or as 'Nan', for example. While it is described herein that a pixel property is determined for each of the guide image pixels 251 it will be understood that this need not be the case. Pixel properties can be determined for any set of the guide image pixels 251 including only a single guide image pixel. Further still it will be understood that pixel properties can be determined for a subset of the guide image pixels and that such guide image pixels need not be adjacent.

In this example, the pixel properties 252 are a set of distances 263. The set of distances can be the distance from a guide image pixel 251 to adjacent guide image pixels 253. The distance 263 can determined by calculation, estimation, or measurement. In this example, the distance 263 is from the center of guide image pixel 251' at location B2 to the center of each adjacent guide image pixel 253 (pixels at locations A1-A3, B1, B3, and C1-C3). As such, in the embodiment of FIG. 3A, the pixel properties 252 for guide image pixel 251' at location B2 includes eight distances.

Referring to FIG. 3B, a table 260 displaying additional pixel properties 252 for guide image pixel 251' at location B2 of FIG. 2 is provided in accordance with an exemplary embodiment of the present disclosure. In this example, the object 100 is a rotor blade for a gas turbine engine and the pixel properties 252 for guide image pixel 251' can include other information or data. The area, surface inclination, and surface color of guide image pixel 251' can be included in the pixel properties 252. The angle and length of the ray 235 to the center of the guide image pixel 251' can be included in the pixel properties 252. Additionally, information regarding whether guide image pixel 251' includes a cooling hole of the rotor blade, and the location of the guide image pixel 251' can be included in the pixel properties 252. For example, when the object 100 is a rotor blade for a gas turbine engine, the location can be categorized as a leading edge, a trailing edge an airfoil, a platform, etc. Other calculations, estimations, or measurements can also be included in the pixel properties 252. For example, distances from various locations of guide image pixel 251' to other various locations of guide image pixel 251' are included in the pixel properties 252, in this example. Even though only a few examples of data that can be included in the guide image pixel properties 252 have been provided, it should be understood that other data can be included in the guide image pixel properties 252. For example, the angle of each of the corners, the angle of the ray 235 to each of the corners, the angle of the ray 235 to the middle of each side, the distance 263 from each of the corners, etc.

Figure 4:
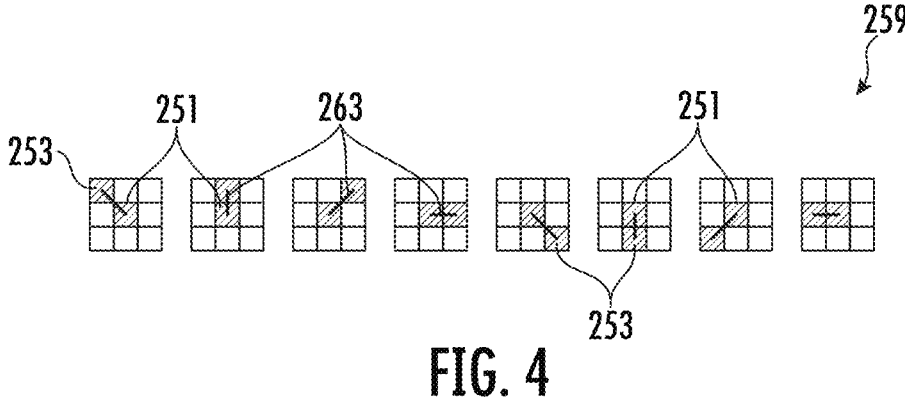
FIG. 4 is a visual depiction of an algorithm to determine one or more pixel properties for a guide image pixel in accordance with an exemplary embodiment of the present disclosure.

Referring to FIG. 4, a visual depiction of an algorithm 259 to determine one or more pixel properties 252 for a guide image pixel 251 is provided in accordance with an exemplary embodiment of the present disclosure. As used herein, "algorithm" refers to a set of instructions to achieve a particular goal. For example, there could be various ways to achieve the goal of determining distances between one guide image pixel 251 and another guide image pixel 251. The algorithm to achieve the goal of determining distances between guide image pixels 251 may be a specific set of instructions on how to determine the distances between guide image pixels 251.

Referring still to FIG. 4, a pixel property 252 can be a set of distances 263, which can be determined, as mentioned. For example, the set of distances 263 can be the distance 263 from a guide image pixel 251 to its adjacent guide image pixels 253. In the example of FIG. 4, a distance 263 is calculated, estimated, or measured from the center of the guide image pixel 251 to each of the adjacent guide image pixels 253. The distances, represented as the straight line that goes from the center of the guide image pixel 251 to the center of the adjacent guide image pixel 253, may be stored as a numerical value in a table 260, such as the tables 260 of FIG. 3A or FIG. 3B.

Figure 5:
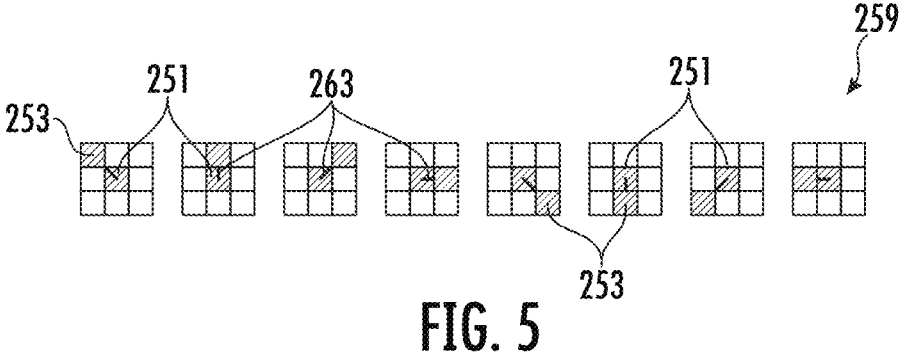
FIG. 5 is a visual depiction of an algorithm to determine pixel properties for a guide image pixel in accordance with an exemplary embodiment of the present disclosure.

Referring to FIG. 5, a visual depiction of an algorithm 259 to determine pixel properties 252 for a guide image pixel 251 is provided in accordance with an exemplary embodiment of the present disclosure. More specifically, an algorithm 259 to determine a set of distances 263 is provided in accordance with an exemplary embodiment of the present disclosure. In this example, a distance 263 may be calculated, estimated, or measured from the center of the guide image pixel 251 to the closest region of the adjacent guide image pixel 253. This can be repeated for each adjacent guide image pixel 253 to determine a set of distances 263. The distance 263, represented as the straight line that goes from the center of the guide image pixel 251 to the closest region of the adjacent guide image pixels 253, may be stored as a numerical value in a table 260, such as the tables of FIG. 3A or FIG. 3B.

Figure 6:
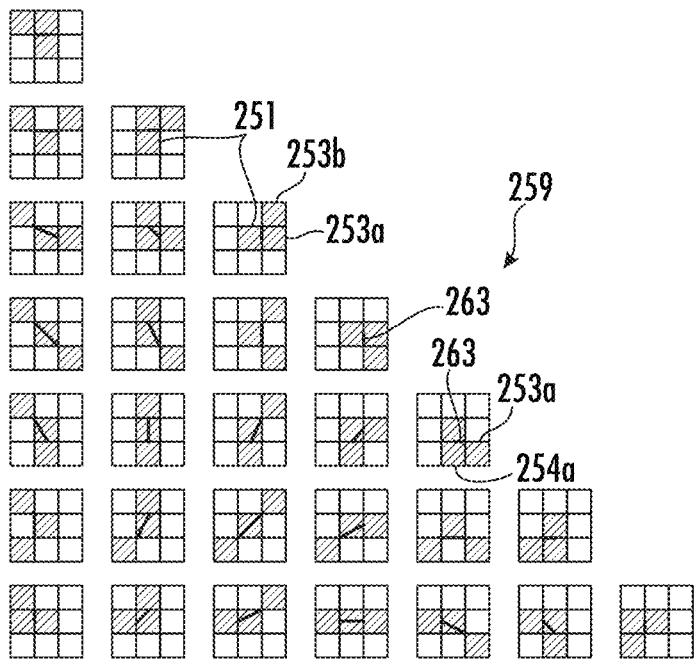
FIG. 6 is a visual depiction of an algorithm to determine pixel properties for a guide image pixel in accordance with an exemplary embodiment of the present disclosure.

Referring to FIG. 6, a visual depiction of an algorithm 259 to determine pixel properties 252 for a guide image pixel 251 is provided in accordance with an exemplary embodiment of the present disclosure. More specifically, an algorithm 259 to determine a set of distances 263 is provided in accordance with an exemplary embodiment of the present disclosure. In this example, a distance 263 may be calculated, estimated, or measured from a first adjacent guide image pixel 253a to a second adjacent guide image pixel 253b of the guide image pixel 251 by making a straight-line from a middle of a side or a corner of a first adjacent guide image pixel 253a, through the guide image pixel 251, and to a middle of a side or a corner of a second adjacent guide image pixel 253b. This can be repeated for each adjacent guide image pixel 253 to determine a set of distances. The pixel properties 252, which are the distances 263 represented as the straight lines that traverse through the guide image pixels 251, may be stored as numerical values in a table 260, such as the tables of FIG. 3A or FIG. 3B.

Figure 7:
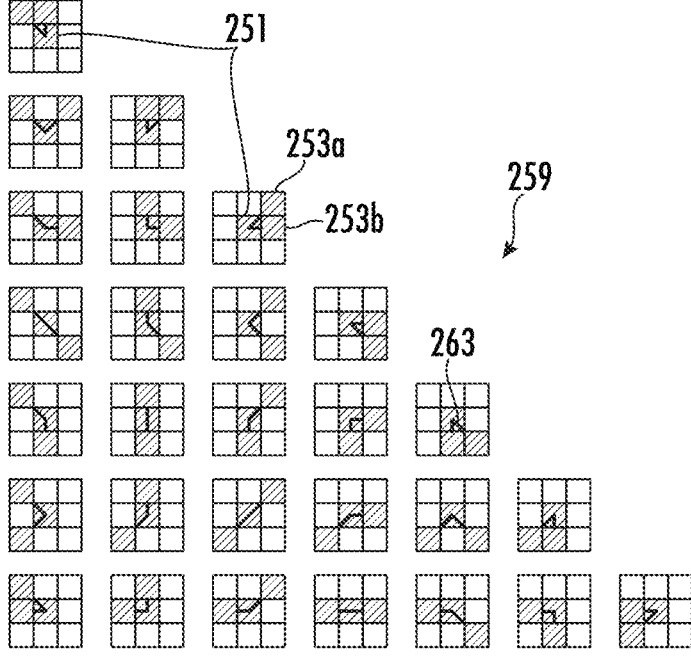
FIG. 7 is a visual depiction of an algorithm to determine pixel properties for a guide image pixel in accordance with an exemplary embodiment of the present disclosure.

Referring to FIG. 7, a visual depiction of an algorithm 259 to determine pixel properties 252 for a guide image pixel 251 is provided in accordance with an exemplary embodiment of the present disclosure. More specifically, an algorithm 259 to determine a set of distances 263 is provided in accordance with an exemplary embodiment of the present disclosure. In this example, a distance 263 may be calculated, estimated, or measured from a first adjacent guide image pixel 253a to a second adjacent guide image pixel 253b of the guide image pixel 251 by making the shortest, straight-line path from the first adjacent guide image pixel 253a to the center of the guide image pixel 251 and then the shortest, straight-line path from the center of the guide image pixel 251 to the second adjacent guide image pixel 253b. This can be repeated for each adjacent guide image pixel 253 to determine a set of distances. The pixel properties 252, which are the distances 263 represented as the straight lines that traverse through the guide image pixels 251, may be stored as numerical values in a table 260, such as the tables of FIG. 3A or FIG. 3B.

As will be appreciated further from the discussion herein below, one or more of the above algorithms 259 may be used to determine a distance or area on an inspection image in response to a user input selection associated with a continuous segment of inspection image pixels. Notably, however, in order to utilize the pixel properties 252 of the guide image pixels 251 of the guide image, the inspection image may need to be associated with the guide image to facilitate use of the pixel properties 252 of the guide image pixels 251 in response to the user input. Such aspects are described in more detail below.

Figure 8:
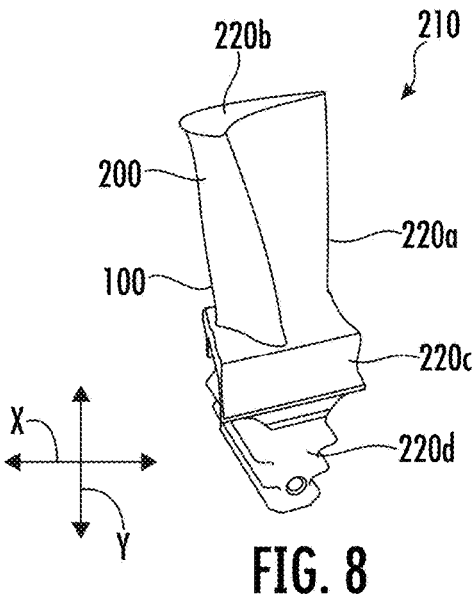
FIG. 8 is a simplified image depicting the 3D model of the object of FIG. 1A in accordance with an exemplary embodiment of the present disclosure.

Referring now to FIG. 8, a simplified image 210 depicting the 3D model 200 of the object 100 of FIG. 1A is provided in accordance with an exemplary embodiment of the present disclosure. As shown, the simplified image 210 may be a two-dimensional (2D) line drawing of the 3D model 200 in the determined orientation. In other examples, the simplified image 210 is a 2D image that realistically depicts the 3D model 200. For example, the simplified image 210 may be a 2D grayscale image or a 2D colored image. In at least one example, the simplified image 210 is an image that is made to appear to be a photograph of the object. For example, the simplified image 210 may have the same or similar appearance, style, color, shading, etc. as a photograph of the object. The simplified image 210 may depict only key features 220. Key features 220 may be the most relevant and/or prominent features. For example, and referring to the example of FIG. 8, which provides a simplified image 210 of the 3D model 200 of the rotor blade of FIG. 1A, the simplified image 210 may include lines that represent the outside perimeter 220a, the shape of the tip 220b, the shape of the blade platform 220c, and the dovetail root end 220d. However, other features can be represented, such as cooling holes. As will be explained in more detail, creating a simplified image 210 can assist in determining an orientation of an object 100 and correlating pixel properties 252.

Figure 9:
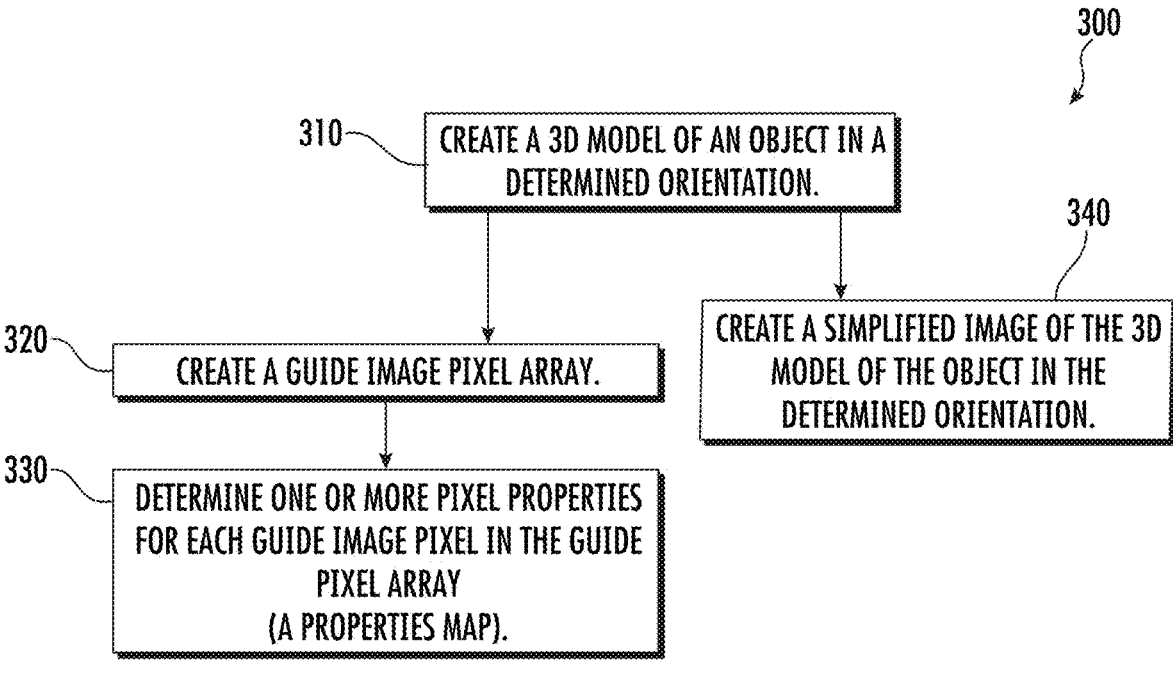
FIG. 9 is a flow chart diagram illustrating a method for determining pixel properties and creating a simplified image of a 3D model in accordance with an exemplary embodiment of the present disclosure.

Referring to FIG. 9, a method 300 for determining pixel properties 252 and creating a simplified image 210 of a 3D model 200 is provided in accordance with an exemplary embodiment of the present disclosure. The method 300 can include a step 310 of creating a 3D model 200 of an object 100 in a determined orientation. The method 300 can include a step 320 of creating a guide image pixel array 250. The method 300 can include a step 330 of determining a pixel property 252 for at least one guide image pixel 251 in the guide image pixel array 250 (a properties map). Properties can include but are not limited to, dimensional properties, area properties, depth information, etc. The method 300 can include a step 340 of creating a simplified image 210 of the 3D model 200 in the determined orientation. In some examples, method 300 does not include step 340. As will be explained further, steps of other methods can be performed with the 3D model in lieu of the simplified image 210 of the 3D model 200. Also, the timing of step 340 is not affected by the timing of when the other steps of method 300 are performed.

Method 300 can be repeated numerous times. For example, it may be beneficial to perform method 300 for various determined orientations of the 3D model 200. For example, method 300 can be repeated up to two-hundred times, for example, fifty to one-hundred fifty times, each for a different determined orientation of the 3D model 200. Therefore, for each determined orientation of the 3D model 200, one or more pixel properties 252 for at least one guide image pixel 251 in the guide image pixel array 250 can be determined. Also, for each determined orientation of the 3D model 200, a simplified image 210 of the 3D model 200 of the object 100 can be created in the determined orientation. As will be explained later, the determined orientation can be associated with the 3D model 200, a simplified image 210 of the 3D model 200, or an inspection image.

The determined orientation of each of the various determined orientation may vary slightly. For example, the various determined orientations may vary by up to 2 mm on the X-axis, Y-axis, and/or Z-axis and/or within 2 degrees for tilt on the X-axis, Y-axis, and Z-axis.

Figure 10:
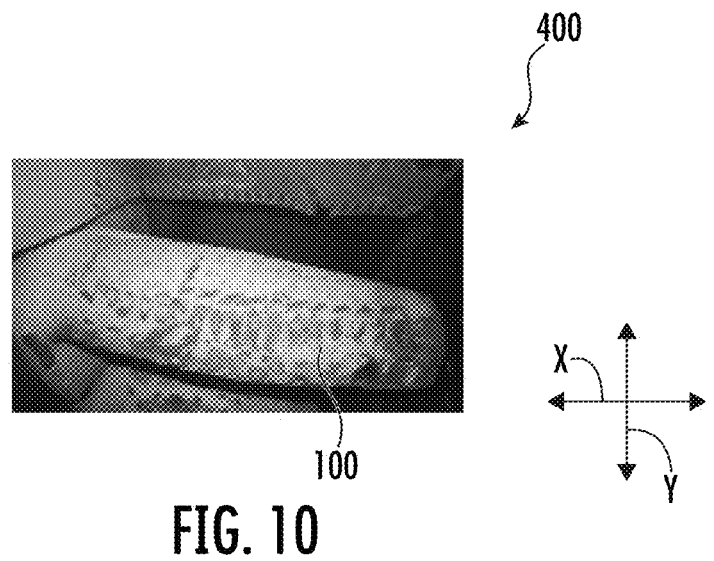
FIG. 10 is an inspection image of an object in accordance with an exemplary embodiment of the present disclosure.

Referring to FIG. 10, an inspection image 400 of an object 100 is provided in accordance with an exemplary embodiment of the present disclosure. The inspection image 400 may be a picture of an object 100, which in this example is a real-world object. The inspection image can be produced with a visual image recording device such as the visual image recording device 230 previously described. Inspection image data indicative of the inspection image may be generated. Inspection image data may include the inspection image 400, the capture date (the date or date and time the inspection image 400 was generated), the number of cycles, the number of hours in operation, the location where the inspection image 400 was generated, an identification of the object 100 under inspection, an identification of the user that was operating the visual image recording device when the inspection image 400 was generated, the positioning of the visual image recording device when the inspection image 400 was generated, etc.

The visual image recording device may be a component of an inspection tool assembly. The inspection tool assembly can assist the operator with taking photographs at a desired orientation. Therefore, the picture, such as the picture of FIG. 10, can be taken at a desired orientation. However, variations of the orientation of the image in relation to the visual image recording device may exist due to various factors. The various factors may be tolerances, such as component tolerances, assembly tolerances, and installation tolerances, and/or mechanical wear in the inspection tool assembly. As such, the actual orientation of the object 100 in relation to the visual image recording device may deviate from the desired orientation.

In some examples, a "stream" of inspection images 400, such as pictures of a real-world object, can be created. For example, when the real-world object is a rotor blade for a gas turbine engine, the rotor system on which the rotor blade is installed can be rotated while a series of pictures are taken with, e.g., a borescope camera, creating the stream of pictures. In some instances, the inspection tool assembly may include a mounting structure configured to mount the borescope camera to the gas turbine engine and through a borescope opening (or other opening) to facilitate the borescope camera taking pictures of the components (e.g., the rotor blades), from a consistent position and orientation between multiple inspections of the same engine, as well as from a consistent position and orientation between multiple inspections of different engines of the same or similar model.

As will be explained in greater detail, the picture that most closely matches the orientation of a 3D model 200 or a simplified image 210 of a 3D model 200 can be selected for further analysis.

In some examples, the picture can be corrected. For example, the picture may be corrected for any optical distortions to account for lens and manufacturing variation for the visual image recording device and/or for the inspection tool assembly. Additionally, or alternatively, the picture can be corrected to account for relatively minor inconsistencies in the orientation of the object in the picture relative to the orientation of the 3D model 200 or the simplified image 210 of a 3D model 200.

Figure 11:
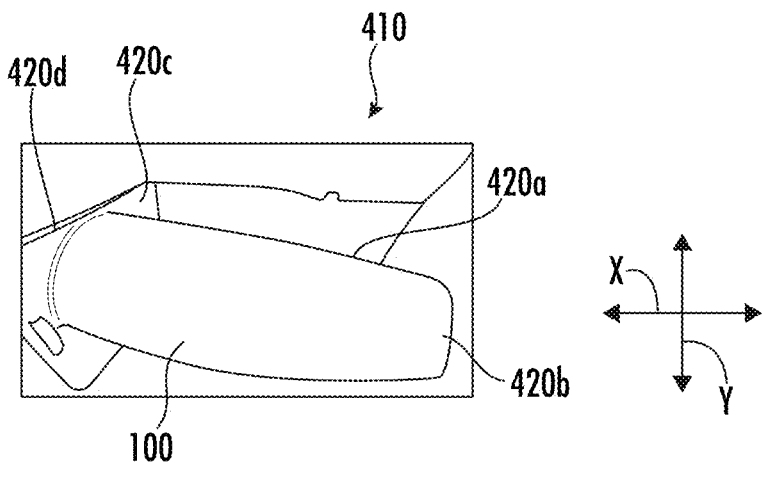
FIG. 11 is a simplified image of the inspection image of FIG. 10 in accordance with an exemplary embodiment of the present disclosure.

Referring to FIG. 11, a simplified image 410 of the inspection image 400 of FIG. 10 is provided in accordance with an exemplary embodiment of the present disclosure. In this example, the simplified image 410 is displayed as a line drawing and the object 100 is a rotor blade for a gas turbine engine. In other examples, the simplified image 410 of the object 100 may be a 2D grayscale image or a 2D colored image. For example, the simplified image 410 can be a photograph of the object 100.

The simplified image 410 may depict key features 420. Key features 420 may be the most relevant and/or prominent features. For example, the key features 420 may be the outside perimeter 420a of the simplified image, the shape of the tip 420b, the blade platform 420c, or the abutment 420d of the rotor blade with an adjacent rotor blade. However, other features can be represented, such as cooling holes in a non-limiting example.

Filters, such as a Canny edge detection filter or a Sobel filter may be applied to the picture to assist in extracting the key features 420. However, other machine learning, such as deep learning-based segmentation techniques, can be used to provide a learned representation of the features that are most prominent.

Figure 12:
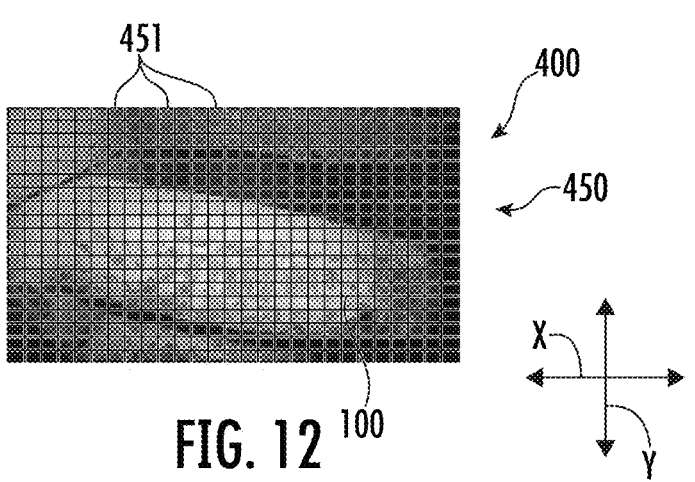
FIG. 12 is an inspection image pixel array of the inspection image of FIG. 10 in accordance with an exemplary embodiment of the present disclosure.

Referring to FIG. 12, an inspection image pixel array 450 of the inspection image 400 of FIG. 10 is provided in accordance with an exemplary embodiment of the present disclosure. As shown, the inspection image 400 of the object 100 can be subdivided into inspection image pixels 451, creating an inspection image pixel array 450. In another example, the simplified image 410 of the object 100 can be subdivided into an array of inspection image pixels 451, forming an inspection image pixel array 450. It should be understood that the size of each of the inspection image pixels 451 are exaggerated for clarity in the figures. Each inspection image pixel 451 can be any size and there can be any number of inspection image pixels 451 within the inspection image pixel array 450. The number of inspection image pixels 451 and/or the size of each of the inspection image pixels 451 may be dependent on the size and/or resolution of the inspection image 400. As will be explained in more detail, the inspection image pixel array 450 and/or inspection image pixels 451 can be associated with a guide image pixel array 250 and/or guide image pixels 251.

Figure 13:
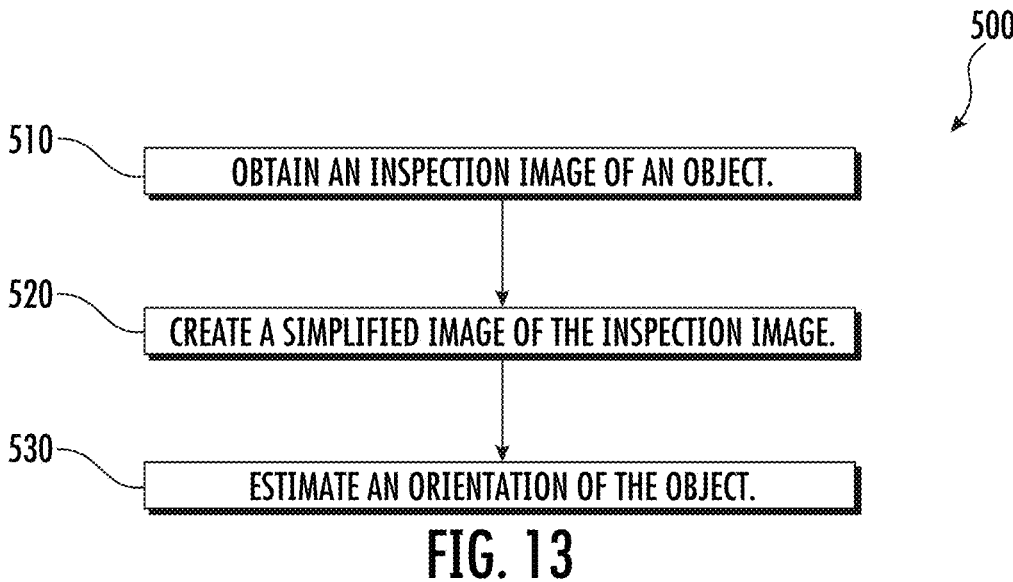
FIG. 13 is a method for estimating an orientation of an object in accordance with an exemplary embodiment of the present disclosure.

Referring to FIG. 13, a method 500 for estimating an orientation of an object 100 is provided in accordance with an exemplary embodiment of the present disclosure. The method 500 can include a step 510 of obtaining an inspection image 400 of an object 100, such as the object 100 of FIG. 10. The method 500 can include a step 520 of creating a simplified image 410 of the inspection image 400, such as the simplified image 410 of FIG. 11. The method 500 can include a step 530 of estimating an orientation of the object 100. In at least one example, the method 500 includes steps 510, 520, and 530. In other examples, the method 500 does not include step 520, but includes steps 510 and 530.

The orientation of the object 100 may be estimated by inputting the inspection image 400 or the simplified image 410 of the object 100 into a pose recovery regression, which may be a machine learning network, such as a deep learning network. This network can be trained with synthetic data and can estimate the orientation of the real-world object based on the 2D inspection image 400 of the object 100 and/or the simplified image 410 of the inspection image 400. The synthetic data may be a plurality of training images with known extrinsic data. For example, the synthetic data may be a plurality of training images that have known, determined orientations. The training images may be simplified images 210, which can be 2D images that realistically depict the 3D model 200 or a 2D image that only shows key features 220 of the 3D model 200. In some examples, the training images are images that are made to appear to be inspection images 400. For example, the training images may have the same or similar appearance, style, color, shading, etc. as inspection images 400.

The orientation of the object 100 may be estimated by "matching" the inspection image 400 of the object 100 or the simplified image 410 of the object 100 to a simplified image 210 of a 3D model 200. For example, as mentioned, numerous simplified images 210 of a 3D model 200 can be created, each depicting the 3D model 200 in a different, determined orientation. The simplified image 410 or the inspection image 400 can be compared to one or more of the simplified images 210 of the 3D model 200. The simplified image 210 of the 3D model 200 that best matches the simplified image 210 of the 3D model 200 can be chosen, either by a human or by a computing system. The orientation of the object 100 can then be estimated to be the same as, or similar to, the determined orientation of the 3D model 200 of the chosen simplified image. For example, the estimated orientation of the object 100 can be estimated to be within a certain tolerance of the determined orientation of the 3D model 200 of the chosen simplified image. The certain tolerance could be, for example, within 3 mm on the X-axis, Y-axis, and Z-axis and within 5 degrees for tilt on the X-axis, Y-axis, and Z-axis. When the determined orientation of the 3D model 200 is based on a 3D scan of a control object, additional tolerances could be accounted for due to potential tolerances inherent to the 3D scanning machine and/or tolerances of the control object.

In at least one example, the inspection image 400 or the simplified image 410 of the inspection image 400 may be transformed. The inspection image 400 or the simplified image 410 of the inspection image 400 may be transformed to correct for residual differences between the simplified image 210 of the 3D model 200 and the inspection image 400 or the simplified image 410 of the inspection image 400. Transforms can include linear and rotational offset, scale, shear, pinch/punch, distortion, tombstone correction, etc.

The transforms may decrease the differences between the simplified image 410 of the inspection image 400 and the simplified image 210 of the 3D model 200, or may decrease the differences between the inspection image 400 and the simplified image 210 of the 3D model. The transformations can occur before or after being matched to the simplified image 210 of the 3D model 200.

Transform data may be generated to document the amount and location of transforms that were made to reduce the residual differences between the simplified image 210 of the 3D model 200 and the inspection image 400 or the simplified image 410 of the inspection image 400. For example, transform data may be quantitative values and/or qualitative values that describe the transform. The transform data can include six degree of freedom orientation transforms. Transform data may include information indicative of an inspection image 400 relative to the determined orientation associated with the guide image data of the object 100. For example, the transform data may include information indicative of the six degrees of freedom orientation corrections made to reduce the differences between the simplified image 210 of the 3D model 200 and the inspection image 400 or the simplified image 410 of the inspection image 400.

Generating transform data has several benefits. For example, the inspection image 400 or a subsequent inspection image 400, such as a second inspection image 400, may be transformed using the transform data at a later date or time. Also, guide image data, can be transformed using the transform data.

Pixel properties 252 that are created from a 3D model 200 of an object 100 can be associated with the inspection image 400. The pixel properties 252 can be associated based on the inspection image 400, transformed or non-transformed, the simplified image 410 of the inspection image 400, transformed or non-transformed, the estimated orientation of the inspection image 400, or a combination thereof.

For example, and as earlier explained, an orientation of an inspection image 400 can be determined by matching the inspection image 400 of an object 100 or the simplified image 410 of an object 100 to a simplified image 210 of a 3D model 200. The matched simplified image 210 of the 3D model 200 can have an associated guide image pixel array 250, each of the guide image pixels 251 having one or more pixel properties 252. The guide image pixel array 250, along with their pixel properties 252, can be associated with the inspection image 400 of the object 100 or the simplified image 410 of the object 100. More specifically, at least one of the guide image pixels 251 of a simplified image 210 of a 3D model 200 can be associated with at least one inspection image pixel 451 of an inspection image 400 of an object 100 or a simplified image 410 of an object 100.

In some examples, there is a 1:1 ratio of association between guide image pixels 251 and inspection image pixels 451. However, in another example, there is an uneven ratio such that it is not a 1:1 ratio. For example, more than one guide image pixel 251 can be associated with one inspection image pixel 451. In another example, more than one inspection image pixel 451 can be associated with one inspection image pixel 451. An uneven ratio may be caused by higher resolutions or lower resolutions of the visual image recording device used to generate the inspection image 450 as compared to the resolution of the simplified image 210 of the 3D model 200.

There are various ways of associating guide image pixels 251 of a simplified image 210 of a 3D model 200 with an inspection image 400 of an object 100 or a simplified image 410 of an object 100. For example, the guide image pixels 251 can be "mapped" to corresponding inspection image pixels 451. For example, X, Y coordinates for the boundaries of each of the guide image pixels 251 of the simplified image 210 of the 3D model 200 can be generated. X, Y coordinates for the boundaries of each of the inspection image pixels 451 of the inspection image 400 can be generated. Because the inspection image 400, or the simplified image 410, can be "matched" to a simplified image 210 of the 3D model 200, the X, Y coordinates of the inspection image 400 can be matched to the X,Y coordinates of the simplified image 210 of the 3D model 200. In effect, the inspection image 400 can be "overlayed" with the guide image pixels 251 of the simplified image 210 of the 3D model 200. Therefore, each of the guide image pixels 251 can be mapped, or associated with, a corresponding inspection image pixel 451.

It should be noted that an inspection image pixel 451 can be of a different size than the associated guide image pixel 251. For example, the guide image pixel 251 may be larger than the inspection image pixel 451, relative to the object 100. As such, two or more inspection image pixels 451 may be associated with a guide image pixel 251.

In another example, the guide image pixels 251 of the simplified image 210 of the 3D model 200 are "transferred" onto the inspection image 400. Information regarding the boundaries of each of the guide image pixels 251 can be stored within the inspection image 400. For example, the information regarding the boundaries of each of the guide image pixels 251 can be stored as metadata of the inspection image 400.

In yet another example, a table 260 correlating the X, Y coordinates of the inspection image 400 with the corresponding guide image pixel 251 of the simplified image 210 of the 3D model 200 can be created.

Once guide image pixels 251 of a simplified image 210 of a 3D model 200 are associated with an image of an object 100 or a simplified image 210 of an object 100, the pixel properties 252 of each of the guide image pixels 251 can also be associated with the image of the object 100 or the simplified image 210 of the object 100. For example, because each guide image pixel 251 can have corresponding pixel properties 252, the guide image pixels 251 along with their pixel properties 252 can be associated with the image of the object 100 or the simplified image 210 of the object 100.

Figures 14, 15:
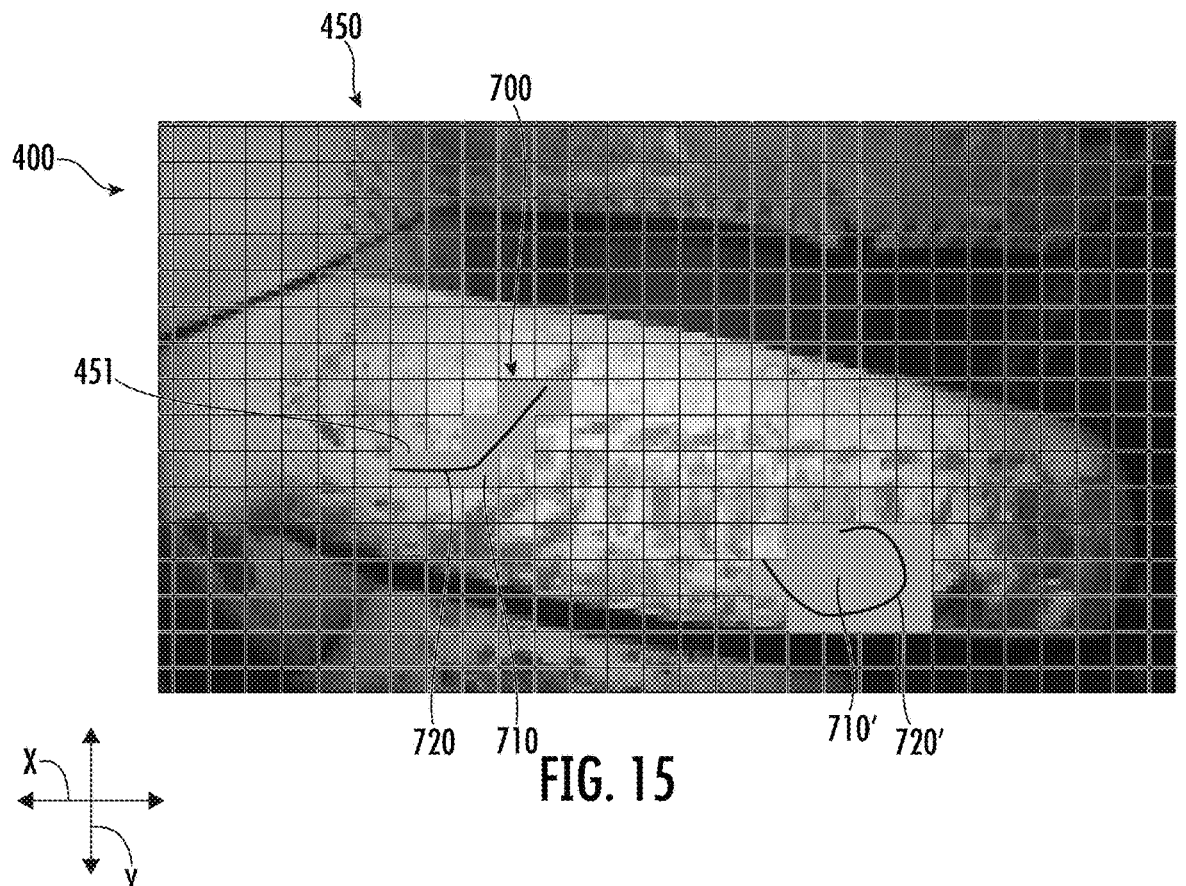
FIG. 14 is a flow chart diagram illustrating a method for determining a property of an object in accordance with an exemplary embodiment of the present disclosure.
FIG. 15 is an inspection image with a portion of the inspection image pixel array of FIG. 12 designated in accordance with an exemplary embodiment of the present disclosure.

Referring to FIG. 14, a method 600 for determining a property of an object 100 is provided in accordance with an exemplary embodiment of the present disclosure. The method 600 includes a step 610 of determining guide image data of an object 100 from a determined orientation. Guide image data can include a guide image pixel array 250 and a pixel property 252 for at least one guide image pixel 251 in the guide image pixel array 250 (a properties map). Guide image data may also include a simplified image 210 of the 3D model 200 of the object 100. As earlier explained, the guide image pixels 251, the pixel properties 252, and the simplified image 210 of the 3D model 200 of the object 100 can be created from a 3D model 200 of an object 100.

The method 600 includes a step 620 of receiving or determining inspection image data indicative of an inspection image 400. The inspection image data can include an inspection image 400 of the object 100, a simplified image 410 of the object 100, an estimated orientation of the object 100, an inspection image pixel array 450, or a combination thereof.

The method 600 includes a step 630 of associating the inspection image data with the guide image data. As explained, there are various ways of associating guide image pixels 251 of a simplified image 210 of a 3D model 200 with an image of an object 100 or a simplified image 410 of an object 100.

The method 600 includes a step 640 of determining a property of the object 100 based on the guide image data and the associated inspection image data. As explained, once guide image pixels 251 of a simplified image 210 of a 3D model 200 are associated with an image of an object 100 or a simplified image 410 of an object 100, the pixel properties 252 of each of the guide image pixels 251 can also be associated with the image of the object 100 or the simplified image 410 of an object 100. For example, the pixel properties 252 of each of the guide image pixels 251 in a guide image pixel array can be associated with a corresponding inspection image pixel 451 in an array of inspection image pixels 451.

More specifically, one or more properties of the object 100 can be determined based on guide image data and the associated inspection image data for each inspection image pixel 451 in an inspection image pixel array 450. As such, one or more properties of the object 100 can be determined. The one or more properties of the object 100 can be any information including, but not limited to, dimension, a distance, a location, a feature, a color, a surface inclination, a categorization, a quality, a criticality, etc. When the property is a distance, the distance can be a Euclidian or a Geodesic distance. When the property is a distance or a dimension, the measurement, calculation, or estimation can account for the topology of the object. The property can be a numerical value, a text value, a binary value, a quantitative value, a qualitative value, a categorical value, a symbolic value, or a combination thereof, to name a few examples. Other calculations, estimations, or measurements can also be a property of the object.

Referring to FIG. 15, an inspection image 400 with a portion 700 of the inspection image pixel array 450 of FIG. 12 designated is provided in accordance with an exemplary embodiment of the present disclosure. In this example, seven of the inspection image pixels 451 of the inspection image pixel array 450 have been designated. The inspection image pixels 451 can be designated by a user. For example, a user could designate one or more inspection image pixels 451 with a peripheral device. The peripheral device could be a touch screen, a stylus, a mouse, a rollerball, etc.

The inspection image 400 and the inspection image pixel array 450 can be displayed to the user through a peripheral device. The peripheral device may be an auxiliary device of a computing system that can display an image to a user. For example, the peripheral device may be a computer monitor and may be a touch screen monitor.

The user could designate a continuous segment 710 of inspection image pixels 451 of the inspection image pixel array 450. As used herein, a "continuous segment" refers to a plurality of inspection image pixels 451 within an inspection image pixel array 450 that are designated and adjacent to at least one other designated inspection image pixel. As used herein, "designation" refers to the continuous segment 710 of inspection image pixels 451 of the inspection image pixel array 450 that is designated by a user or a computing system. For example, a user could designate one or more inspection image pixels 451 by drawing a line 720, as shown. The line 720 drawn by the user may also be displayed to the user through the peripheral device. The user could draw a straight line, a curved line, a line having no specific geometry or profile, or a combination thereof. The inspection image pixels 451 that the line 720 passes through can be designated, creating a linear, continuous segment 710 of inspection image pixels. The linear, continuous segment 710 of inspection pixels could represent a curved or straight line 720. In regions that the line 720 is perpendicular to or parallel to the X-axis, the line 720 can designate a portion of the inspection image pixel array 450 that is one pixel wide or one pixel tall. In regions that the line 720 is oblique to or acute to the X-axis, the line 720 can designate a portion of the inspection image 400 that is at least two pixels wide or at least two pixels tall or one pixel wide and one pixel tall. For example, in regions that the line 720 is at a 30 degree angle to the X-axis, the line 720 can designate a portion that is one pixel tall and five pixels wide. As another example, in regions that the line 720 is at a forty-five degree angle to the X-axis, the line 720 can designate a portion that is one pixel wide and one pixel tall such that the corners of the pixels within the portion have corners that are adjoined. Anti-aliasing methods may be used to account for sub-pixel interpolation of user designations. For example, anti-aliasing methods can be used to improve the appearance of the continuous segment 710 of inspection image pixels 451 of the inspection image pixel array 450.

In another example, a computing system could designate a continuous segment 710 of inspection image pixels 451 of the inspection image pixel array 450. For example, the computing system could be taught, through machine learning, to analyze the inspection image 400 to identify certain key features. These key features may be automatically designated.

The user could designate a continuous, closed segment 710' of inspection image pixels 451. For example, one or more inspection image pixels 451 could be designated by drawing a line 720' that encompasses, partially or fully, an area of the inspection image 400. The area of the inspection image 400 that is encompassed, partially or fully, by the line 720' can be automatically designated, creating a closed segment 710' of inspection image pixels 451.

Figure 16:
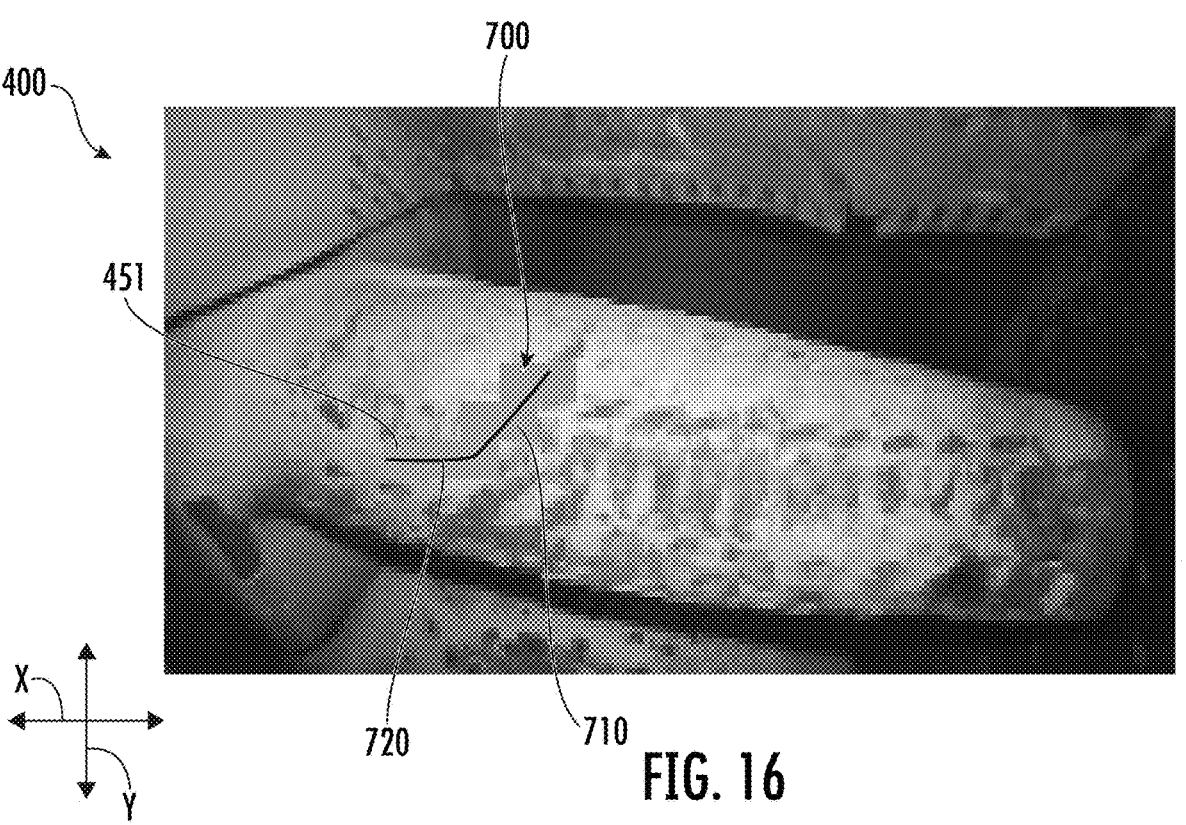
FIG. 16 is an inspection image with a portion of the inspection image pixel array of FIG. 12 designated in accordance with an exemplary embodiment of the present disclosure.

Referring to FIG. 16, an inspection image 400 with a portion 700 of the inspection image pixel array 450 of FIG. 12 designated is provided in accordance with an exemplary embodiment of the present disclosure. The inspection image pixels 451 can be designated the same or similarly as the example embodiment of FIG. 15 However, in this example, the inspection image pixel array 450 is not displayed to the user.

Figure 17:
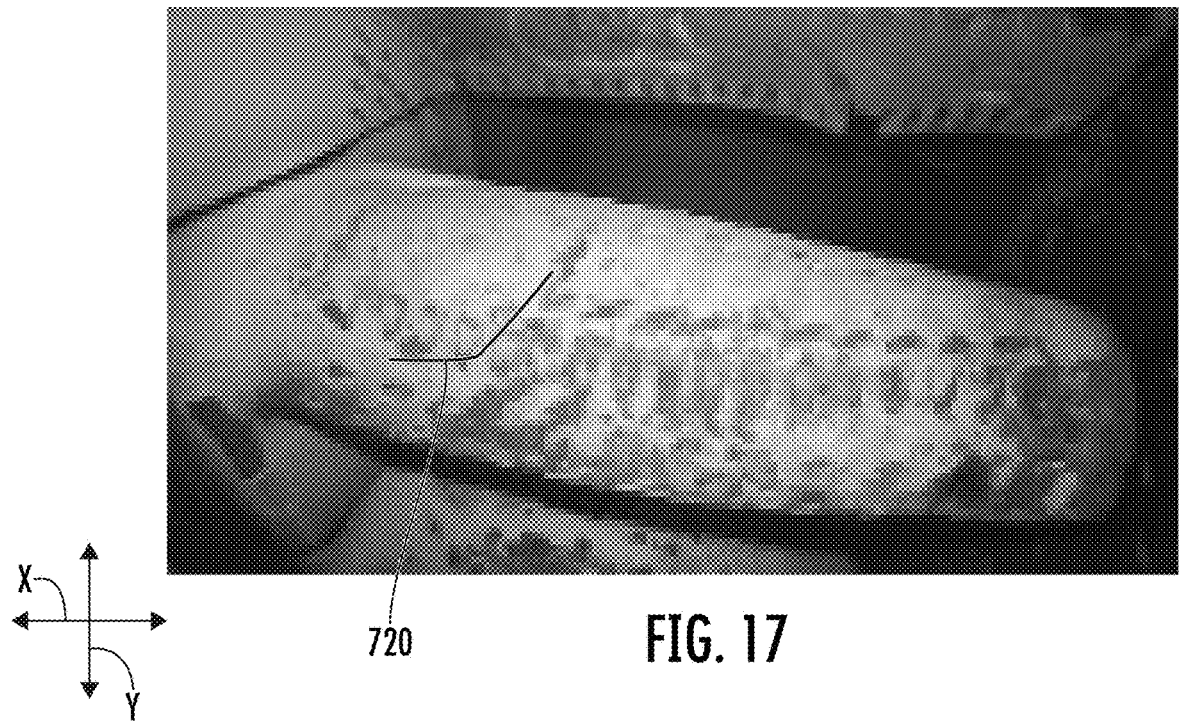
FIG. 17 is an inspection image with a portion of the inspection image pixel array of FIG. 12 designated in accordance with an exemplary embodiment of the present disclosure.

Referring to FIG. 17, an inspection image 400 with a portion 700 of the inspection image pixel array 450 of FIG. 12 designated is provided in accordance with an exemplary embodiment of the present disclosure. The inspection image pixels 451 can be designated the same or similarly as the example embodiment of FIG. 15. However, in this example, neither the inspection image pixel array 450 nor the designated portions 700 of the inspection image pixel array 450 is displayed to the user.

Figure 18:
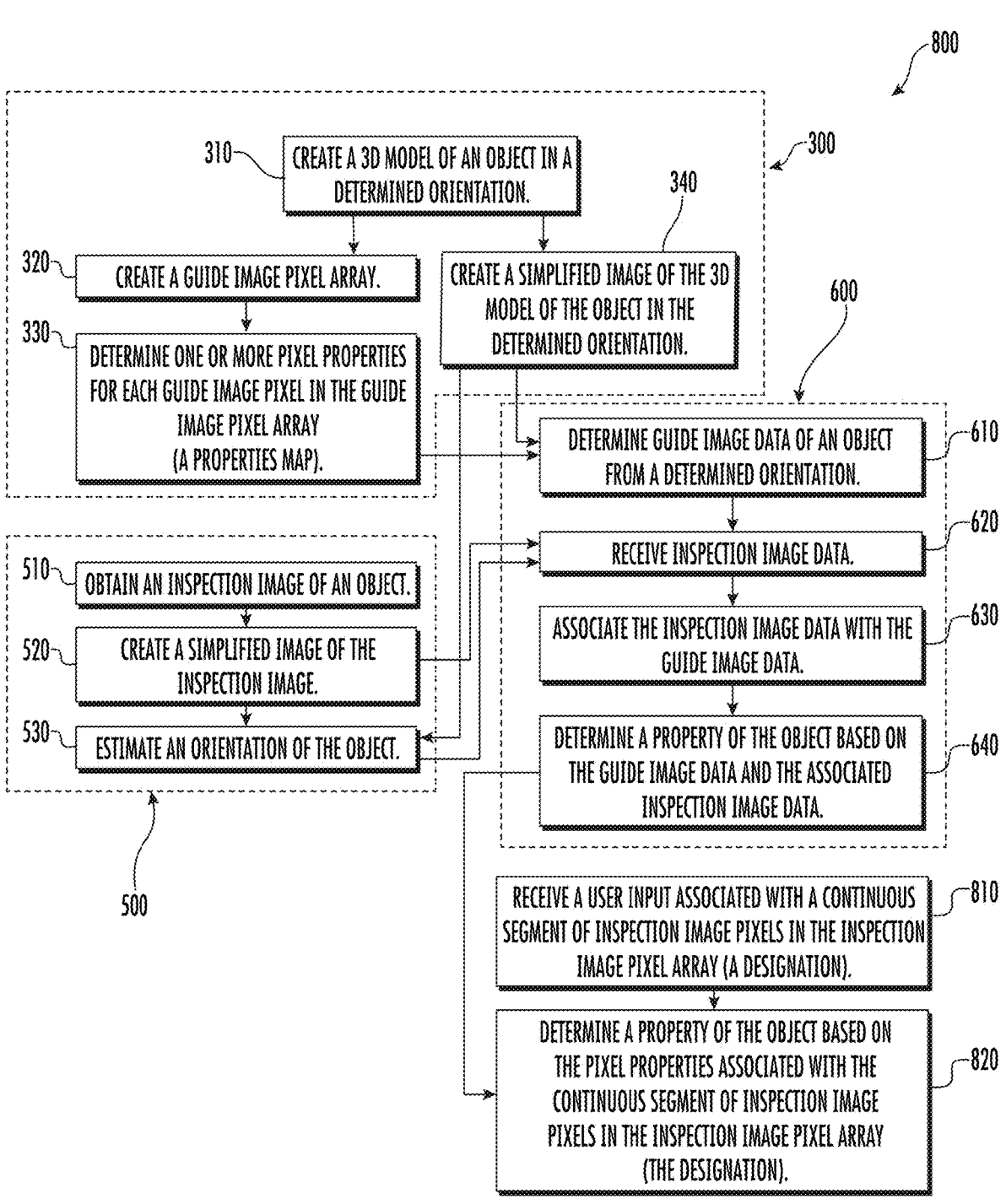
FIG. 18 is a flow chart diagram illustrating a method for determining a property of an object in accordance with an exemplary embodiment of the present disclosure.

Referring to FIG. 18, a method 800 for determining a property of an object 100 is provided in accordance with an exemplary embodiment of the present disclosure. Method 800 can include one or more of the steps of method 300, as discussed above. For example, method 800 can include the step 310 of creating a 3D model 200 of an object 100 in a determined orientation. The method 800 can include the step 320 of creating a guide image pixel array 250. The method 800 can include the step 330 of determining a pixel property 252 for at least one guide image pixel 251 in the guide image pixel array 250. The method 800 can include the step 340 of creating a simplified image 410 of the 3D model 200 in the determined orientation.

Steps 310, 320, 330, and 340 can be repeated numerous times. For example, it may be beneficial to perform the steps for various determined orientations of the 3D model 200. For example, method 300 can be repeated up to ten-thousand times, such as up to five-thousand times, such as up to one-thousand times, such as up to two-hundred times, each for a different determined orientation of the 3D model 200. Therefore, for each determined orientation of the 3D model 200, one or more pixel properties 252 for at least one guide image pixel 251 in the guide image pixel array 250 can be determined. Also, for each determined orientation of the 3D model 200, a simplified image 210 of the 3D model 200 of the object 100 can be created in the determined orientation. The determined orientation of each of the various determined orientation may vary only slightly. For example, the various determined orientations may only vary by only up to 2 mm on the X-axis, Y-axis, and/or Z-axis and/or within 2 degrees for tilt on the X-axis, Y-axis, and Z-axis.

Method 800 can include one or more of the steps of method 500, as discussed above. For example, method 800 can include the step 510 of obtaining an inspection image 400 of an object 100, such as the object 100 of FIG. 10. Method 800 can include the step 520 of creating a simplified image 410 of the inspection image 400, such as the simplified image 410 of FIG. 11. Method 800 can include the step 530 of estimating an orientation of the object 100. As explained, the orientation of the object 100 may be estimated by "matching" the image of the object 100 or the simplified image 410 of an object 100 to a simplified image 210 of a 3D model 200.

Method 800 can include one or more of the steps of method 600, as discussed above. For example, method 800 can include the step 610 of determining guide image data of an object 100 from a determined orientation. Guide image data can include a guide image pixel array 250 and a pixel property 252 for at least one guide image pixel 251 in the guide image pixel array 250. As earlier explained, the guide image pixels 251 and the pixel properties 252 can be created from a 3D model 200 of an object 100.

Method 800 can include the step 620 of receiving or determining inspection image data indicative of an inspection image 400. The inspection image data can include an inspection image 400 of the object 100, a simplified image 410 of an object 100, an estimated orientation of the object 100, an inspection image pixel array 450, or a combination thereof.

Method 800 can include the step 630 of associating the inspection image data with the guide image data. As explained, there are various ways of associating guide image pixels 251 of a simplified image 210 of a 3D model 200 with an image of an object 100 or a simplified image 410 of an object 100.

Method 800 can include the step 640 of determining a property of the object 100 based on the guide image data and the associated inspection image data. As explained, once guide image pixels 251 of a simplified image 210 of a 3D model 200 are associated with an image of an object 100 or a simplified image 410 of an object 100, the pixel properties 252 of each of the guide image pixels 251 can also be associated with the image of the object 100 or the simplified image 410 of an object 100. For example, the pixel properties 252 of each of the guide image pixels 251 in a guide image pixel array can be associated with a corresponding inspection image pixel 451 in an inspection image pixel array 450.

Method 800 can include a step 810 of receiving a user input associated with a continuous segment of inspection image pixels 451 in the inspection image pixel array 450 (a designation). As explained, a user could designate one or more inspection image pixels 451 with a peripheral device.

Method 800 can include a step 820 of determining a property of the object 100 based on the pixel properties 252 associated with the continuous segment of inspection image pixels 451 in the inspection image pixel array 450. As explained in reference to step 640, one or more properties of the object 100 can be determined based on guide image data and the associated inspection image data for each inspection image pixel 451 in an inspection image pixel array 450. As such, one or more properties of the object 100 can be determined based on the one or more inspection image pixels 451 designated by the user.

The one or more properties of the object 100 can be any information that relates to the continuous segment of inspection image pixels 451. For example, the one or more properties could be a dimension, a distance, a location, a feature, a color, a surface inclination, a categorization, a quality, a criticality, etc. When the property is a distance, the distance can be a Euclidian or a Geodesic distance. When the property is a distance or a dimension, the measurement, calculation, or estimation can account for the topology of the object. The property can be a numerical value, a text value, a binary value, a quantitative value, a qualitative value, a categorical value, a symbolic value, or a combination thereof, to name a few examples. Other calculations, estimations, or measurements can also be a property of the object.

In at least one example, a user could designate a continuous segment 710 of inspection image pixels 451 that represents a feature of the object. The feature of the object 100 can be any portion of the object 100 that is of interest to the user. For example, the feature could be a cooling hole location for a gas turbine engine blade. In other examples, the feature could be damage to the object 100 that may be visible to the user in the inspection image 400. More specifically, the feature could be a crack on the object, a chip on the object, or a spalling location of a coating on the object.

In at least one example, the user can "trace" a crack on an inspection image 400 of an object 100, such as an inspection image 400 of a gas turbine engine, with a line 720. The inspection image pixels 451 that the line traverses through can be designated. Therefore, various information and data regarding the crack can be determined. For example, a length of the crack can be determined. Referring briefly to the examples provided in FIG. 4 through FIG. 7, a set of distances 263 can be determined. The distance 263 can be the distance 263 from a guide image pixel 251 to its adjacent guide image pixels 253. These distances 263 can be associated with inspection image pixels 451. In order to determine a length of a crack, the distances 263 between a designated pixel and an adjacent designated pixel is determined, for each of the designated pixels in a continuous segment. The distances 263 between each of the designated pixels and the adjacent designated pixel is then summed to determine a total length of the crack.

In at least one example, the user can select a region on an inspection image 400 of an object 100, such as an inspection image 400 of a gas turbine engine rotor blade, with a line 720 to designate a closed segment 710' of inspection image pixels 451. Therefore, various information and data regarding the region can be determined. For example, the total area of the region can be determined. Referring briefly to the example provided in FIG. 3B, a pixel property 252 of a guide image pixel 251 can be the area of the guide image pixel 251. The guide image pixel property 252 can be associated with an inspection image pixel 451. As such, the guide image pixel property 252, such as an area of a pixel, can be associated with a designated pixel. To determine the area of the designated closed segment 710' of inspection image pixels 451, the areas of each of the designated pixels within the closed segment 710' are summed.

Method 800 can include providing an indication to a user corresponding to the property of the object. For example, the property of the object 100 based on the guide image data and the associated inspection image data can be displayed to the user through a peripheral device of a computing system, such as a computer monitor. In another example, the property of the object 100 based on the pixel properties 252 associated with the continuous segment of inspection image pixels 451 in the inspection image pixel array 450 can be displayed to the user through a peripheral device of a computing system, such as a computer monitor. As another example, an indication as to whether the property of the object exceeds a threshold value can be displayed to the user through a peripheral device of the computing system. For example, a first property of the object may be the length of a designation, which can correspond to a length of a crack on the object. A second property of the object may be a threshold value for the length of the crack on the object. If the length of the crack exceeds the threshold value, an indication that the length of the crack exceeds the threshold value can be displayed to the user. If the length of the crack does not exceed the threshold value, an indication that the length of the crack is within an acceptable tolerance can be displayed to the user.

In yet another example, a first property of the object may be the length of a designation, which can correspond to a length of a crack on the object 100. A second property of the object may be the location of the designation, which can correspond to a location of the crack on the object 100. A third property of the object 100 may be a threshold value for a length of a crack on the object at the corresponding location. If the length of the crack exceeds the threshold value for the corresponding location, an indication that the length of the crack exceeds the threshold value can be displayed to the user. If the length of the crack does not exceed the threshold value, an indication that the length of the crack is within an acceptable tolerance can be displayed to the user. In this way, one or more properties of the object 100, such as the location and the length of a designation, can be compared against another property, such as the threshold value for the length of the crack at the location of the designation. The results of the comparison can be displayed to the user.

In yet another example, a first property of the object 100 may be a first size of a feature on an object 100, such as a crack, and a second property of the object 100 may be a second size of the feature on the object 100. The first size of the feature on the object 100 can be compared to the second size of the feature on the object 100 to determine a growth of the feature on the object based on the first size of the feature on the object 100 and the second size of the feature on the object 100. The growth of the feature on the object 100 can be compared to a threshold value. An indication can be displayed as to whether the growth of the feature on the object 100 exceeds a threshold value.

In addition to providing an indication to a user corresponding to the property of the object, other information, such as a prediction as to when the property of the object 100 will exceed a threshold value could be displayed to the user.

Some properties of the object, such as a threshold value, may be stored in locations other than in the properties map. For example, one or more properties of the object can be stored in a memory device of a computing system.

Method 800 can include initiating a maintenance action of the object 100 in response to determining the property of the object 100. For example, if the property of the object 100, such as a size of a crack, chip, or spalling location, exceeds a threshold value, a maintenance action of the object 100 can be initiated. Other factors may be considered to determine whether to initiate a maintenance action of the object 100 in response to determining the property of the object 100. For example, when the object 100 is a rotor blade for a gas turbine engine, the length of time between the next scheduled repair or overhaul event can be considered. If it is projected that the property of the object 100, such as a length of a crack, may grow to exceed a threshold value before the next scheduled repair or overhaul event, a maintenance action of the object 100 may be initiated. A "maintenance action" can be an inspection of the object 100 that can be scheduled based on operational parameters of the object 100. For example, when the object 100 is a component for a gas turbine engine, the inspection can be based on a thrust limit, temperature limit, time limit, cycles limit, etc. In some examples, a "maintenance action" can be an operational limitation placed on the component. For example, when the object 100 is a component for a gas turbine engine, the object 100 can be derated such that the thrust rating of the object is reduced, which can reduce the thrust power rating for takeoff and/or climb of the aircraft that the gas turbine engine is installed on. A "maintenance action" can also be a material ordering action (procuring replacement components), an overhaul scheduling action, a preventative maintenance action, or a repair action.

Figure 19:
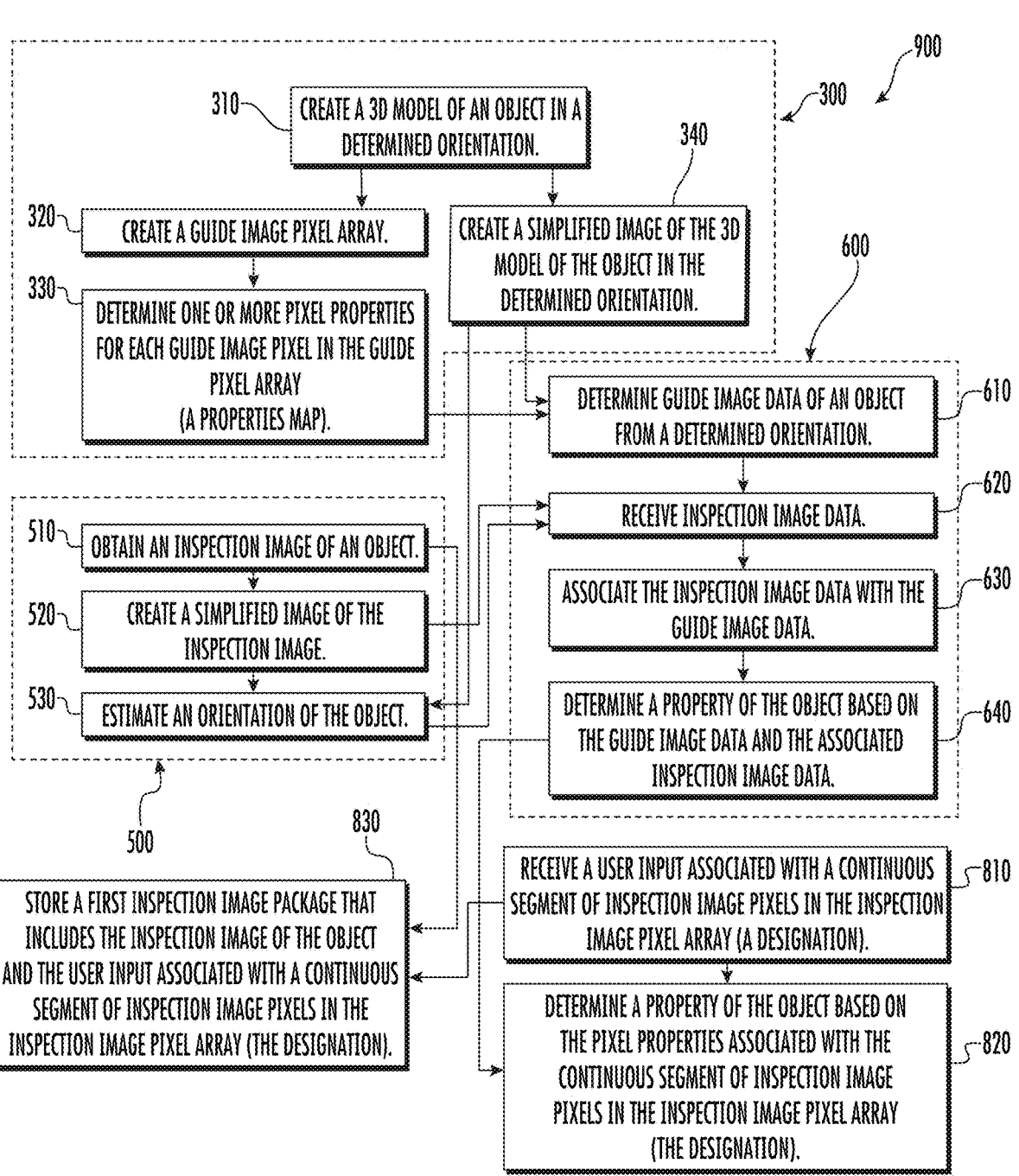
FIG. 19 is a flow chart diagram illustrating a method for storing an inspection package of an object in accordance with an exemplary embodiment of the present disclosure.

Referring to FIG. 19, a method 900 for storing an inspection package of an object 100 is provided in accordance with an exemplary embodiment of the present disclosure. Method 900 can be similar to method 800 and can include methods 300, 500, 600. In this example, however, method 900 includes a step 830 of storing a first inspection package that includes the inspection image 400 of the object 100 and the user input associated with a continuous segment 710 of inspection image pixels 451 in the inspection image pixel array 450 (the designation). The first inspection package may also include the one or more pixel properties 252 for at least one guide image pixel 251 in the guide image pixel array 250 using the first algorithm (the properties map), and/or the transform data, and/or the determined orientation. The first inspection package can be stored on a computing system.

One of the benefits of storing the inspection package is that the step 820 of determining a property of the object 100 based on the pixel properties associated with the continuous segment 710 of inspection image pixels 451 in the inspection image pixel array 450 can be redetermined using a second algorithm, a second properties map, or a second designation. For example, algorithms may change over time, which may also change the properties map, and methods for designations may change over time, which may also change a property of the object 100. An algorithm or method for designation may change because of an optimization or an improvement to the algorithm or method for designation. Therefore, it may be useful to redetermine past properties of the object 100 based on the newer, second algorithm, the newer, second properties map, or the newer, second method for designation. This may ensure an apples-to-apples comparison (comparing using the same algorithm, properties map, or designation) of an object 100, a property of the object 100, or a feature of an object 100 overtime, which will be explained in more detail, even if the algorithm for determining the properties map changes or if the method for designation changes.

In at least one example, in lieu of, or in addition to, storing the inspection package of the object 100, other inspection data can be stored. For example, inspection data can include the designation, the estimated orientation of the object 100, or the property of the object 100 based on the designation.

Referring to FIG. 20, a method 1000 for comparing a first property of an object 100 with a second property of the object 100 is provided in accordance with an exemplary embodiment of the present disclosure. Method 1000 can include a step 1010 of recalling a first inspection package that includes a first inspection image 400 of the object 100 and a first designation. The first inspection image 400 package may also include a first properties map of the object 100. As mentioned in reference to FIG. 19 and method 900, the first inspection package can be stored on a computing system. Therefore, the first inspection package can later be retrieved from the computing system. Method 1000 can include a step 1015 of receiving, recalling, or both, one or more properties maps of the object 100. Step 1015 may include receiving or recalling a first properties map and receiving or recalling a second properties map.

Method 1000 can include a step 1020 of receiving data indicative of a second inspection package that includes a second inspection image 400 of the object 100 and a second designation. As mentioned in reference to step 510 of method 500, an inspection image 400 of an object 100 can be obtained. As mentioned in reference to step 810 of method 800, a user input associated with a continuous segment 710 of inspection image pixels 451 in the inspection image pixel array 450 (a designation) can be received.

Step 1020 may also include displaying the first designation from the first inspection package to the user. The first designation may be overlaid on the second inspection image of the second inspection package. Overlaying the first designation on the second inspection image may provide a cue, guide, or indication for the user, which may assist the user with the inspection.

Method 1000 can include a step 1030 of determining a first property of the object 100 based on the first inspection image 400 of the object, the one or more properties maps of the object, and the first designation. As mentioned in reference to step 820 of method 800, a property of the object 100 can be determined based on guide image data, which includes a properties map and the designation. Method 1000 can include a step 1040 of determining a second property of the object 100 based on the second inspection image 400 of the object, the one or more properties maps of the object, and the second designation. As briefly mentioned, algorithms for determining the properties map may change over time. As such, it may be beneficial for the first property of the object 100 and the second property of the object 100 to be both determined based on the same properties map. However, in other examples, it may be beneficial for the first property of the object 100 and the second property of the object 100 to be based on different properties maps.

Method 1000 can include a step 1050 of comparing the first property with the second property. Comparing the first property with the second property may include determining a difference between a feature on the object 100. For example, comparing the first property with the second property may include determining a growth of the feature on the object 100. As mentioned, the feature could be damage to the object 100 that may be visible to the user in the inspection image 400. In some examples, the feature could be a crack on the object 100, a chip on the object 100, or a spalling location of a coating on the object 100. As such, comparing the first property with the second property may include determining a growth or change of the crack, chip, or spalling of the coating.

In some examples, the first inspection image 400 defines a first capture date, and the second inspection image 400 defines a second capture date. The second capture date may be after the first capture date. For example, the second capture date may be at least one month later than the first capture date, such as at least six months later, such as at least one year later, such as at least three years later, and up to twenty years later than the first capture date, such as up to fifteen years later, such as up to ten years later, such as up to five years later. In at least one example, the first inspection image 400 defines a first use-related metric, such as number of hours or number of cycles, and the second inspection image 400 defines a second use-related metric. The second use-related metric may be greater than the first use-related metric. For example, the second use-related metric may be at least ten cycles greater than the first use-related metric, such as at least twenty cycles greater, such as at least fifty cycles greater, such as at least one-hundred cycles greater, such as at least one-thousand cycles greater, and up to one-thousand cycles greater, such as up to five-hundred cycles greater, such as up to one-hundred cycles greater.

In some examples, it may be beneficial to determine the growth or change of a crack, chip, or spalling of a coating periodically. For example, when the object 100 is a rotor blade for a gas turbine engine, it may be beneficial to compare a property, such as a length of a crack on the rotor blade, when the engine that the rotor blade is installed on is scheduled for maintenance or an inspection.

In some examples, determining the first property of the object 100 comprises determining the first property of the object 100 proximate to the second capture date. For example, the first property of the object 100 may be determined on a date, a "determination date", that is closer to the second capture date than the first capture date. As mentioned, it may be beneficial to redetermine a property of the object 100 based on a newer algorithm so that an apples-to-apples comparison can be made, when an older algorithm was previously used to determine the property of the object. Therefore, the first property of the object 100 may have a determination date that is closer to the second capture date than the first capture date.

Figure 21:
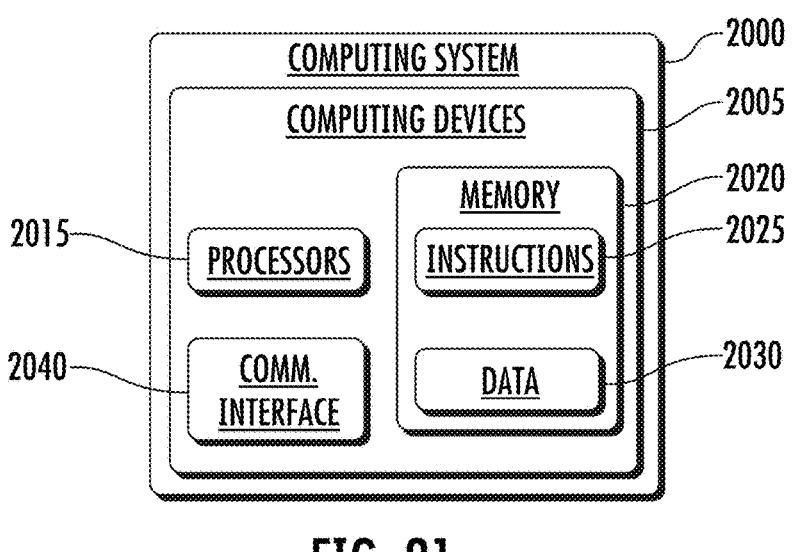
FIG. 21 is a block diagram of a computing system in accordance with an exemplary embodiment of the present disclosure.

Referring to FIG. 21, a block diagram of a computing system 2000 that can be used to implement methods and systems of the present disclosure is provided in accordance with an exemplary embodiment of the present disclosure. Computing system 2000 may be used to implement an inspection system 3000 (FIG. 22), as will be described herein. It will be appreciated, however, that computing system 2000 is one example of a suitable computing system for implementing the inspection system and other computing elements described herein.

As shown, the computing system 2000 can include one or more computing devices 2005. The one or more computing devices 2005 can include one or more processors 2015 and one or more memory devices 2020. The one or more processors 2015 can include any suitable processing device, such as a microprocessor, microcontroller, integrated circuit, logic device, or other suitable processing device. The one or more memory devices 2020 can include one or more computer-readable media, including, but not limited to, nontransitory computer-readable media, RAM, ROM, hard drives, flash drives, or other memory devices. The one or more memory devices 2020 can include remote storage or internet storage, such as cloud storage.

The one or more memory devices 2020 can store information accessible by the one or more processors 2015, including computer-readable instructions 2025 that can be executed by the one or more processors 2015. The computer-readable instructions 2025 can be any set of instructions that when executed by the one or more processors 2015, cause the one or more processors 2015 to perform operations. The computer-readable instructions 2025 can be software written in any suitable programming language or can be implemented in hardware. In some embodiments, the computer-readable instructions 2025 can be executed by the one or more processors 2015 to cause the one or more processors 2015 to perform operations, such as the operations for controlling an inspection system, and/or any other operations or functions of the one or more computing devices 2005.

The memory devices 2020 can further store data 2030 that can be accessed by the processors 2015. For example, the data 2030 can include pixel properties 252, guide image pixel array 250, transform data, etc., as described herein. The data 2030 can include one or more tables, such as table 260, functions, algorithms, such as algorithm 259, images, such as simplified images 210 and 410, equations, etc. according to example embodiments of the present disclosure.

The one or more computing devices 2005 can also include a communication interface 2040 used to communicate, for example, with the other components of the system. The communication interface 2040 can include any suitable components for interfacing with one or more networks, including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, methods and processes discussed herein can be implemented using a single computing device or multiple computing devices working in combination. Databases, memory, instructions, and applications can be implemented on a single system or distributed across multiple systems. Distributed components can operate sequentially or in parallel.

Figure 22:
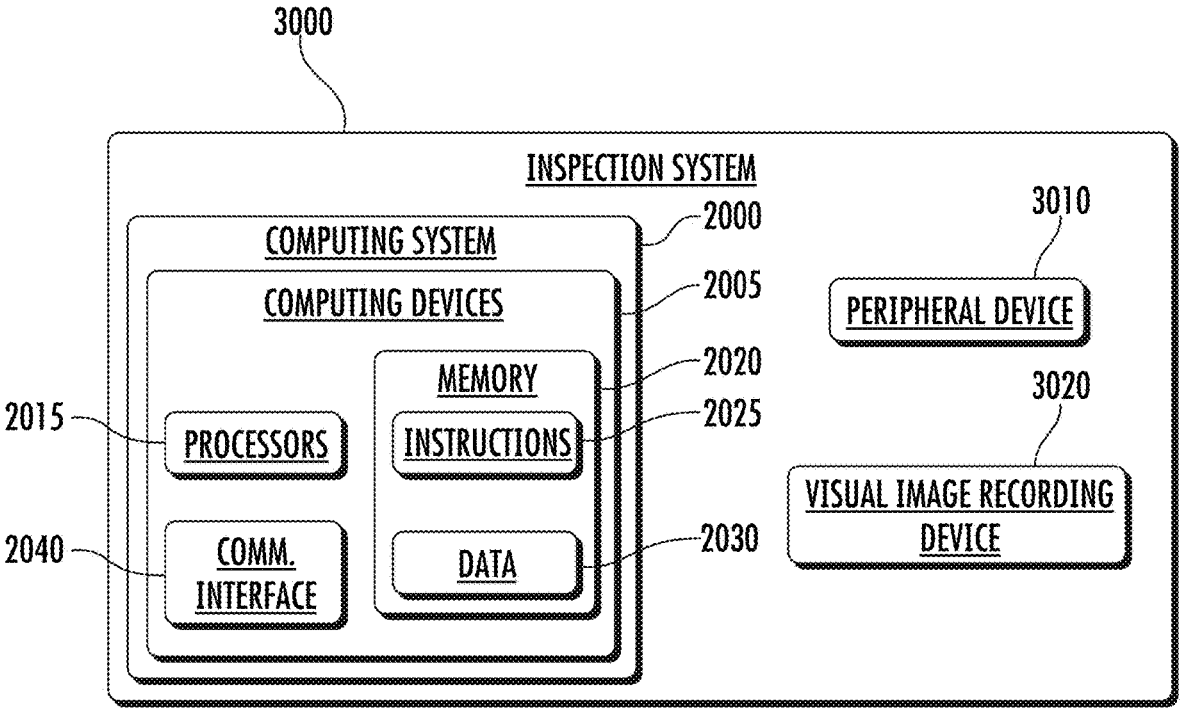
FIG. 22 is a block diagram of an inspection system in accordance with an exemplary embodiment of the present disclosure.

Referring to FIG. 22, a block diagram of an inspection system 3000 is provided in accordance with an exemplary embodiment of the present disclosure. The inspection system 3000 can include one or more computing devices 2005, one or more peripheral devices 3010, and one or more visual image recording devices 3020. As mentioned, a peripheral device 3010 can be a device that a user could use to designate one or more inspection image pixels 451 of an inspection image 400. The peripheral device 3010 could be a touch screen, a stylus, a mouse, a rollerball, etc. Also, as mentioned, a peripheral device 3010 may be a device that can display an image to a user. For example, the peripheral device 3010 may be a computer monitor and may be a touch screen monitor.

As mentioned, a visual image recording device 3020 may be a camera, such as a borescope camera or an endoscope camera. The visual image recording device 3020 may be a monocular camera or a binocular camera. The use of a monocular camera may be beneficial to reduce costs and complexity, and increase reliability and accuracy, as compared to a binocular camera. Also, even though not depicted, the visual image recording device 3020 may be a component of an inspection tool assembly. The inspection tool assembly can assist the operator with taking photographs at a desired orientation.

Even though the disclosure has periodically referred to a gas turbine engine, it should be understood that the methods described can be used to inspect objects on other devices such as wind turbines, automobiles, hydrogen engines, steam engines, etc.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

1. A method for inspecting an object, the method comprising determining a first inspection package that includes a first inspection image of the object and a first designation, determining data indicative of a second inspection package that includes a second inspection image of the object and a second designation, receiving, recalling, or both, one or more properties maps of the object, determining a first property of the object based on the first inspection image of the object, the one or more properties maps of the object, and the first designation, determining a second property of the object based on the second inspection image of the object, the one or more properties maps of the object, and the second designation, and displaying the first property and the second property or displaying data indicative of a comparison of the first property with the second property.

2. The method of any preceding clause, wherein receiving, recalling, or both one or more properties maps of the object comprises receiving or recalling a first properties map, and receiving or recalling a second properties map, wherein determining the first property of the object comprises determining the first property of the object based on the first inspection image of the object, the first properties map of the object, and the first designation, and wherein determining the second property of the object comprises determining the second property of the object based on the second inspection image of the object, the second properties map of the object, and the second designation.

3. The method of any preceding clause, wherein receiving, recalling, or both one or more properties maps of the object comprises receiving or recalling a second properties map, wherein determining the first property of the object comprises determining the first property of the object based on the first inspection image of the object, the second properties map of the object, and the first designation, and wherein determining the second property of the object comprises determining the second property of the object based on the second inspection image of the object, the second properties map of the object, and the second designation.

4. The method of any preceding clause, wherein the first inspection image defines a first capture date, wherein the second inspection image defines a second capture date, wherein determining the first property of the object comprises determining the first property of the object proximate to the second capture date.

5. The method of any preceding clause, wherein the first inspection image defines a first capture date, wherein the second inspection image defines a second capture date, and wherein the second capture date is after the first capture date.

6. The method of any preceding clause, wherein the second capture date is at least six months later than the first capture date and up to 15 years later than the first capture date.

7. The method of any preceding clause, wherein determining the first property of the object comprises determining the first property of the object proximate to the second capture date.

8. The method of any preceding clause, wherein the first property is indicative of a feature on the object, wherein the second property is also indicative of the feature on the object, and wherein displaying data indicative of a comparison of the first property with the second property comprises displaying data indicative of a growth of the feature on the object.

9. The method of any preceding clause, wherein the feature is a crack.

10. The method of any preceding clause, wherein the first designation is a first continuous segment of inspection image pixels in an inspection image pixel array, the second designation is a second continuous segment of inspection image pixels in the inspection image pixel array, wherein an inspection image pixel in the first continuous segment of inspection image pixels is also in the second continuous segment of inspection image pixels.

11. The method of any preceding clause, comprising displaying data indicative of a comparison of the first property with the second property, the first property being a first size of a feature on the object, and the second property being a second size of the feature on the object, wherein displaying data indicative of a comparison of the first property with the second property includes determining a growth of the feature on the object based on the first size of the feature on the object and the second size of the feature on the object, and comparing the growth of the feature on the object to a threshold value.

12. The method of any preceding clause, comprising displaying an indication if the growth of the feature on the object exceeds the threshold value.

13. The method of any preceding clause, comprising initiating a maintenance action of the object if the growth of the feature on the object exceeds the threshold value 14. An inspection system comprising a computing system configured to determine a first inspection package that includes a first inspection image of the object and a first designation, determine data indicative of a second inspection package that includes a second inspection image of the object and a second designation, receive, recall, or both, one or more properties maps of the object, determine a first property of the object based on the first inspection image of the object, the one or more properties maps of the object, and the first designation, determine a second property of the object based on the second inspection image of the object, the one or more properties maps of the object, and the second designation, and display the first property and the second property or compare the first property with the second property.

15. The inspection system of any preceding clause, wherein the computing system is configured to receive or recall a first properties map, and receive or recall a second properties map, determine the first property of the object based on the first inspection image of the object, the first properties map of the object, and the first designation, and determine the second property of the object based on the second inspection image of the object, the second properties map of the object, and the second designation.

16. The inspection system of any preceding clause, wherein the computing system is configured to receive or recall a second properties map, determine the first property of the object based on the first inspection image of the object, the second properties map of the object, and the first designation, and determine the second property of the object based on the second inspection image of the object, the second properties map of the object, and the second designation.

17. The inspection system of any preceding clause, wherein the first inspection image defines a first capture date, wherein the second inspection image defines a second capture date, wherein the computing system is configured to determine the first property of the object proximate to the second capture date.

18. The inspection system of any preceding clause, wherein the first inspection image defines a first capture date, wherein the second inspection image defines a second capture date, and wherein the second capture date is after the first capture date.

19. The inspection system of any preceding clause, wherein the first property is indicative of a feature on the object, wherein the second property is also indicative of the feature on the object, and wherein the computing system is configured to determine a growth of the feature on the object by comparing the first property with the second property.

20. The inspection system of any preceding clause, wherein the first designation is a first continuous segment of inspection image pixels in an inspection image pixel array, the second designation is a second continuous segment of inspection image pixels in the inspection image pixel array, wherein an inspection image pixel in the first continuous segment of inspection image pixels is also in the second continuous segment of inspection image pixels.

We claim:

1. A method for inspecting an object, the method comprising:
  determining a first inspection package that includes a first inspection image of the object and a first designation, wherein the first inspection image includes one or more first inspection image pixel arrays including a location of the one or more first inspection image pixel arrays;
  determining data indicative of a second inspection package that includes a second inspection image of the object and a second designation, wherein the second inspection image includes one or more second inspection image pixel arrays including a location of the one or more second inspection image pixel arrays, wherein the second inspection image is different than the first inspection image;
  determining a first orientation of the object relative to an optical sensor for the first inspection image and determining a second orientation of the object relative to the optical sensor for the second inspection image;
  determining a first property map for the first inspection image based on the first orientation and a second property map for the second inspection image based on the second orientation, wherein, in determining the first property map, only the location of the one or more first inspection image pixel arrays and the orientation of the object in the inspection image are used from the first inspection image, and, wherein, in determining the second property map, only the location of the one or more second inspection image pixel arrays and the orientation of the object in the second inspection image are used from the second inspection image;
  receiving, recalling, or both, the first property map and the second property map;
  determining a first property of the object based on the first property map and the first designation, wherein the first property is associated with the first inspection image, wherein the first property is a first distance which is calculated, estimated, or measured from a first adjacent pixel of the first inspection image pixel array to a second adjacent pixel of the first inspection image array, wherein the distance is determined by making a straight line from a middle of a side or a corner of the first adjacent pixel, through the first adjacent pixel, and to a middle of a side of a corner of the second adjacent pixel;
  determining a second property of the object based on the second property map and the second designation, wherein the second property is associated with the second inspection image, wherein in the second property is a second distance is calculated, estimated, or measured from a first adjacent pixel of the second inspection image pixel array to a second adjacent pixel of the second inspection image array, wherein the distance is determined by making a straight line from a middle of a side or a corner of the second adjacent pixel, through the second adjacent pixel, and to a middle of a side of a corner of the second adjacent pixel;
  aligning the first property map with the second property map by aligning the location of the one or more first inspection image pixel arrays with the location of the one or more second inspection image pixel arrays;
  comparing the first property with the second property;
  displaying the comparison;
  determining damage to the object between the first distance and the second distance; and
  determining a maintenance action based on the comparison, including predicting when the damage will exceed an operational limit.

2. The method of claim 1, wherein the first inspection image defines a first capture date, wherein the second inspection image defines a second capture date, wherein determining the first property of the object comprises determining the first property of the object proximate to the second capture date.

3. The method of claim 1, wherein the first inspection image defines a first capture date, wherein the second inspection image defines a second capture date, and wherein the second capture date is after the first capture date.

4. The method of claim 3, wherein the second capture date is at least six months later than the first capture date and up to 15 years later than the first capture date.

5. The method of claim 3, wherein determining the first property of the object comprises determining the first property of the object proximate to the second capture date.

6. The method of claim 1, wherein the first property is indicative of a feature on the object, wherein the second property is also indicative of the feature on the object, and wherein displaying the comparison comprises displaying a growth of the feature on the object.

7. The method of claim 6, wherein the feature is a crack.

8. The method of claim 1, wherein the first designation is a first continuous segment of inspection image pixels in an inspection image pixel array, the second designation is a second continuous segment of inspection image pixels in the inspection image pixel array, wherein an inspection image pixel in the first continuous segment of inspection image pixels is also in the second continuous segment of inspection image pixels.

9. The method of claim 1, wherein displaying the comparison further includes, the first property being a first size of a feature on the object, and the second property being a second size of the feature on the object, wherein displaying the comparison includes determining a growth of the feature on the object based on the first size of the feature on the object and the second size of the feature on the object; and comparing the growth of the feature on the object to the operational limit.

10. The method of claim 9, comprising displaying an indication if the growth of the feature on the object exceeds the operational limit.

11. The method of claim 9, comprising initiating the maintenance action of the object if the growth of the feature on the object exceeds the operational limit.

12. An inspection system comprising:

a computing system configured to:

determine a first inspection package that includes a first inspection image of an object and a first designation, wherein the first inspection image includes one or more first inspection image pixel arrays including a location of the one or more first inspection image pixel arrays;

determine data indicative of a second inspection package that includes a second inspection image of the object and a second designation, wherein the second inspection image includes one or more inspection second image pixel arrays including a location of the one or more second inspection image pixel arrays wherein the second inspection image is different than the first inspection image;

determine a first orientation of the object relative to an optical sensor for the first inspection image and determining a second orientation of the object relative to the optical sensor for the second inspection image;

determine a first property map for the first inspection image based on the first orientation and a second property map for the second inspection image based on the second orientation, wherein only the location of the one or more first inspection image pixel arrays and the orientation of the object in the inspection image are used from the first inspection image to form the first property map, and, wherein only the location of the one or more second inspection image pixel arrays and the orientation of the object in the second inspection image are used from the second inspection image to form the second property map;

receive, recall, or both, the first property map and the second property map;

determine a first property of the object based on the first property map and the first designation, wherein the first property is associated with the first inspection image, wherein the first property is a first distance which is calculated, estimated, or measured from a first adjacent pixel of the first inspection image pixel array to a second adjacent pixel of the first inspection image array, wherein the distance is determined by making a straight line from a middle of a side or a corner of the first adjacent pixel, through the first adjacent pixel, and to a middle of a side of a corner of the second adjacent pixel;

determine a second property of the object based on the second property map and the second designation, wherein the second property is associated with the second inspection image, wherein in the second property is a second distance is calculated, estimated, or measured from a first adjacent pixel of the second inspection image pixel array to a second adjacent pixel of the second inspection image array, wherein the distance is determined by making a straight line from a middle of a side or a corner of the second adjacent pixel, through the second adjacent pixel, and to a middle of a side of a corner of the second adjacent pixel;

align the first property map with the second property map by aligning the location of the one or more first inspection image pixel arrays with the location of the one or more second inspection image pixel arrays;

compare the first property and the second property;

display the comparison;

determine damage to the object between the first distance and the second distance; and determine a maintenance action based on the comparison, including predicting when the damage will exceed an operational limit.

13. The inspection system of claim 12, wherein the first inspection image defines a first capture date, wherein the second inspection image defines a second capture date, wherein the computing system is configured to determine the first property of the object proximate to the second capture date.

14. The inspection system of claim 12, wherein the first inspection image defines a first capture date, wherein the second inspection image defines a second capture date, and wherein the second capture date is after the first capture date.

15. The inspection system of claim 12, wherein the first property is indicative of a feature on the object, wherein the second property is also indicative of the feature on the object, and wherein the computing system is configured to determine a growth of the feature on the object by comparing the first property with the second property.

16. The inspection system of claim 12, wherein the first designation is a first continuous segment of inspection image pixels in an inspection image pixel array, the second designation is a second continuous segment of inspection image pixels in the inspection image pixel array, wherein an inspection image pixel in the first continuous segment of inspection image pixels is also in the second continuous segment of inspection image pixels.

17. The method of claim 1, wherein the determining of the first property map and the second property map includes creating a first simplified two-dimensional (2D) image of the object in the first orientation and a second simplified 2D image of the object in the second orientation are created.

18. The method of claim 17, wherein the location of the one or more first inspection image pixel arrays is associated with the first simplified 2D image and the location of the one or more second inspection image pixel arrays is associated with the second simplified 2D image to aid in aligning the first property map with the first inspection image and the second property map with the second inspection image.

19. The inspection system of claim 12, wherein the computing system is configured to create a first simplified two-dimensional (2D) image of the object in the first orientation and a second simplified 2D image of the object in the second orientation are created.

20. The inspection system of claim 19, wherein the location of the one or more first inspection image pixel arrays is associated with the first simplified 2D image and the location of the one or more second inspection image pixel arrays is associated with the second simplified 2D image to aid in aligning the first property map with the first inspection image and the second property map with the second inspection image.

* * * * *

32